US012790223B2

(12) United States Patent
Dhanabalan et al.

(10) Patent No.: US 12,790,223 B2
(45) **Date of Patent: *Nov. 10, 2026**

(54) SILICON CARBON COMPOSITES COMPRISING ULTRA LOW Z

(71) Applicant: Group14 Technologies, Inc., Woodinville, WA (US)

(72) Inventors: Abirami Dhanabalan, Bothell, WA (US); Avery J. Sakshaug, Everett, WA (US); Henry R. Costantino, Woodinville, WA (US)

(73) Assignee: Group14 Technologies, Inc., Woodinville, WA (US)

( * ) Notice: Subject to any disclaimer, the term of this patent is extended or adjusted under 35 U.S.C. 154(b) by 1072 days.

This patent is subject to a terminal disclaimer.

(21) Appl. No.: 17/960,698

(22) Filed: Oct. 5, 2022

(65) Prior Publication Data

US 2023/0219819 A1 Jul. 13, 2023

Related U.S. Application Data

(63) Continuation of application No. 17/524,614, filed on Nov. 11, 2021, now Pat. No. 11,492,262, which is a (Continued)

(51) Int. Cl.
*H01M 4/13* (2010.01)
*C01B 32/963* (2017.01)
(Continued)

(52) U.S. Cl.
CPC .......... *C01B 32/963* (2017.08); *C04B 35/565* (2013.01); *C04B 38/0054* (2013.01); (Continued)

(58) Field of Classification Search
CPC ...... H01M 4/366; H01M 4/364; H01M 4/625; H01M 4/386
See application file for complete search history.

(56) References Cited

U.S. PATENT DOCUMENTS 3,518,123 A 6/1970 Katsoulis et al.
3,582,288 A 6/1971 Taylor et al.
(Continued)

FOREIGN PATENT DOCUMENTS

CA 2176452 A1 11/1997
CN 1762900 A 4/2006
(Continued)

OTHER PUBLICATIONS

911 Metallurgist, "Re-agglomeration in Fine Grinding of Coal," retrieved at URL= https://www.911metallurgist.com/reagglomeration-fine-grinding/, on Jul. 5, 2022. (4 pages).
(Continued)

*Primary Examiner* — Maria Laios
*Assistant Examiner* — Zackary Richard Cochenour
(74) *Attorney, Agent, or Firm* — Seed Intellectual Property Law Group LLP

(57) ABSTRACT

Silicon-carbon composite materials and related processes are disclosed that overcome the challenges for providing amorphous nano-sized silicon entrained within porous carbon. Compared to other, inferior materials and processes described in the prior art, the materials and processes disclosed herein find superior utility in various applications, including energy storage devices such as lithium ion batteries.

18 Claims, 6 Drawing Sheets

Relationship between Z and average Coulombic efficiency for various silicon-carbon composite materials.

Related U.S. Application Data continuation of application No. 16/996,694, filed on Aug. 18, 2020, now Pat. No. 11,174,167.

(51) Int. Cl.
*C04B 35/565* (2006.01)
*C04B 38/00* (2006.01)

(52) U.S. Cl.
CPC ...... *C01P 2006/12* (2013.01); *C01P 2006/14* (2013.01); *C01P 2006/40* (2013.01); *C04B 2235/614* (2013.01)

(56) References Cited

U.S. PATENT DOCUMENTS

| | | | |
|---|---|---|---|
| 3,619,428 | A | 11/1971 | David |
| 3,876,505 | A | 4/1975 | Stoneburner |
| 3,892,580 | A | 7/1975 | Messing |
| 3,977,901 | A | 8/1976 | Buzzelli |
| 4,082,694 | A | 4/1978 | Wennerberg et al. |
| 4,159,913 | A | 7/1979 | Birchall et al. |
| 4,198,382 | A | 4/1980 | Matsui |
| 4,206,095 | A | 6/1980 | Wynstra et al. |
| 4,543,341 | A | 9/1985 | Barringer et al. |
| 4,580,404 | A | 4/1986 | Pez et al. |
| 4,769,197 | A | 9/1988 | Kromrey |
| 4,843,015 | A | 6/1989 | Grubbs, Jr. et al. |
| 4,862,328 | A | 8/1989 | Morimoto et al. |
| 4,873,218 | A | 10/1989 | Pekala |
| 4,954,469 | A | 9/1990 | Robinson |
| 4,997,804 | A | 3/1991 | Pekala |
| 4,999,330 | A | 3/1991 | Bose et al. |
| 5,061,416 | A | 10/1991 | Willkens et al. |
| 5,093,216 | A | 3/1992 | Azuma et al. |
| 5,260,855 | A | 11/1993 | Kaschmitter et al. |
| 5,294,498 | A | 3/1994 | Omaru et al. |
| 5,416,056 | A | 5/1995 | Baker |
| 5,420,168 | A | 5/1995 | Mayer et al. |
| 5,465,603 | A | 11/1995 | Anthony et al. |
| 5,508,341 | A | 4/1996 | Mayer et al. |
| 5,529,971 | A | 6/1996 | Kaschmitter et al. |
| 5,583,162 | A | 12/1996 | Li et al. |
| 5,614,460 | A | 3/1997 | Schwarz et al. |
| 5,626,637 | A | 5/1997 | Baker |
| 5,626,977 | A | 5/1997 | Mayer et al. |
| 5,670,571 | A | 9/1997 | Gabrielson et al. |
| 5,674,642 | A | 10/1997 | Le et al. |
| 5,710,092 | A | 1/1998 | Baker |
| 5,726,118 | A | 3/1998 | Ivey et al. |
| 5,744,258 | A | 4/1998 | Bai et al. |
| 5,789,338 | A | 8/1998 | Kaschmitter et al. |
| 5,834,138 | A | 11/1998 | Yamada et al. |
| 5,858,055 | A | 1/1999 | Jahnke et al. |
| 5,858,486 | A | 1/1999 | Metter et al. |
| 5,882,621 | A | 3/1999 | Doddapaneni et al. |
| 5,891,822 | A | 4/1999 | Oyama et al. |
| 5,908,896 | A | 6/1999 | Mayer et al. |
| 5,945,084 | A | 8/1999 | Droege |
| 5,965,483 | A | 10/1999 | Baker et al. |
| 6,006,797 | A | 12/1999 | Bülow et al. |
| 6,064,560 | A | 5/2000 | Hirahara et al. |
| 6,069,107 | A | 5/2000 | Kuznetsov et al. |
| 6,072,693 | A | 6/2000 | Tsushima et al. |
| 6,096,456 | A | 8/2000 | Takeuchi et al. |
| 6,117,585 | A | 9/2000 | Anani et al. |
| 6,147,213 | A | 11/2000 | Poli et al. |
| 6,153,562 | A | 11/2000 | Villar et al. |
| 6,205,016 | B1 | 3/2001 | Niu |
| 6,225,257 | B1 | 5/2001 | Putyera et al. |
| 6,242,127 | B1 | 6/2001 | Paik et al. |
| 6,268,081 | B1 | 7/2001 | Clough |
| 6,309,446 | B1 | 10/2001 | Nakanoya et al. |
| 6,310,762 | B1 | 10/2001 | Okamura et al. |
| 6,339,528 | B1 | 1/2002 | Lee et al. |
| 6,509,119 | B1 | 1/2003 | Kobayashi et al. |
| 6,574,092 | B2 | 6/2003 | Sato et al. |
| 6,592,838 | B1 | 7/2003 | Nomoto et al. |
| 6,631,072 | B1 | 10/2003 | Paul et al. |
| 6,631,073 | B1 | 10/2003 | Sakata et al. |
| 6,697,249 | B2 | 2/2004 | Maletin et al. |
| 6,764,667 | B1 | 7/2004 | Steiner, III |
| 6,815,105 | B2 | 11/2004 | Cooper et al. |
| 6,865,068 | B1 | 3/2005 | Murakami et al. |
| 7,245,478 | B2 | 7/2007 | Zhong et al. |
| 7,419,649 | B2 | 9/2008 | Lundquist et al. |
| 7,582,902 | B2 | 9/2009 | Tano et al. |
| 7,626,804 | B2 | 12/2009 | Yoshio et al. |
| 7,722,991 | B2 | 5/2010 | Zhang et al. |
| 7,723,262 | B2 | 5/2010 | Feaver et al. |
| 7,754,178 | B2 | 7/2010 | Tano et al. |
| 7,785,495 | B2 | 8/2010 | Kikuchi et al. |
| 7,816,413 | B2 | 10/2010 | Feaver et al. |
| 7,835,136 | B2 | 11/2010 | Feaver et al. |
| 8,158,556 | B2 | 4/2012 | Feaver et al. |
| 8,293,818 | B2 | 10/2012 | Costantino et al. |
| 8,329,252 | B2 | 12/2012 | Markavov et al. |
| 8,361,659 | B2 | 1/2013 | Richard |
| 8,366,979 | B2 | 2/2013 | Dai et al. |
| 8,404,384 | B2 | 3/2013 | Feaver et al. |
| 8,411,415 | B2 | 4/2013 | Yoshinaga et al. |
| 8,467,170 | B2 | 6/2013 | Feaver et al. |
| 8,480,930 | B2 | 7/2013 | Suh et al. |
| 8,482,900 | B2 | 7/2013 | Gadkaree et al. |
| 8,580,870 | B2 | 11/2013 | Costantino et al. |
| 8,654,507 | B2 | 2/2014 | Costantino et al. |
| 8,691,177 | B2 | 4/2014 | Pfeifer et al. |
| 8,709,971 | B2 | 4/2014 | Feaver et al. |
| 8,734,991 | B2 | 5/2014 | Takano et al. |
| 8,797,717 | B2 | 8/2014 | Feaver et al. |
| 8,906,978 | B2 | 12/2014 | Costantino et al. |
| 8,916,296 | B2 | 12/2014 | Feaver et al. |
| 8,999,202 | B2 | 4/2015 | Mulik et al. |
| 9,005,812 | B2 | 4/2015 | Ma et al. |
| 9,067,848 | B2 | 6/2015 | Stadie et al. |
| 9,112,230 | B2 | 8/2015 | Feaver et al. |
| 9,133,295 | B2 | 9/2015 | Qureshi et al. |
| 9,133,337 | B2 | 9/2015 | Ludvik et al. |
| 9,136,064 | B2 | 9/2015 | Gadkaree et al. |
| 9,186,174 | B2 | 11/2015 | Krishnan |
| 9,269,502 | B2 | 2/2016 | Chang et al. |
| 9,287,556 | B2 | 3/2016 | Neumann et al. |
| 9,409,777 | B2 | 8/2016 | Geramita et al. |
| 9,412,523 | B2 | 8/2016 | Costantino et al. |
| 9,464,162 | B2 | 10/2016 | Kron et al. |
| 9,580,321 | B2 | 2/2017 | Feaver et al. |
| 9,666,860 | B2 | 5/2017 | Lam et al. |
| 9,680,159 | B2 | 6/2017 | Feaver et al. |
| 9,704,685 | B2 | 7/2017 | Lozano et al. |
| 9,709,971 | B2 | 7/2017 | Ellis |
| 9,714,172 | B2 | 7/2017 | Geramita et al. |
| 9,985,289 | B2 | 5/2018 | Costantino et al. |
| 10,008,338 | B2 | 6/2018 | Stadermann et al. |
| 10,049,824 | B2 | 8/2018 | Tsukada et al. |
| 10,141,122 | B2 | 11/2018 | Feaver et al. |
| 10,147,950 | B2 | 12/2018 | Sakshaug et al. |
| 10,173,900 | B2 | 1/2019 | Ludvik et al. |
| 10,195,583 | B2 | 2/2019 | Costantino et al. |
| 10,273,328 | B2 | 4/2019 | Kron et al. |
| 10,287,170 | B2 | 5/2019 | Feaver et al. |
| 10,361,428 | B2 | 7/2019 | Kim et al. |
| 10,454,094 | B2 | 10/2019 | Xia et al. |
| 10,454,103 | B2 | 10/2019 | Sakshaug et al. |
| 10,490,358 | B2 | 11/2019 | Feaver et al. |
| 10,522,836 | B2 | 12/2019 | Thompkins et al. |
| 10,590,277 | B2 | 3/2020 | Costantino et al. |
| 10,600,581 | B2 | 3/2020 | Feaver et al. |
| 10,608,254 | B2 | 3/2020 | Sakshaug et al. |
| 10,711,140 | B2 | 7/2020 | Costantino et al. |
| 10,714,744 | B2 | 7/2020 | Sakshaug et al. |
| 10,756,347 | B2 | 8/2020 | Sakshaug et al. |
| 10,763,501 | B2 | 9/2020 | Feaver et al. |
| 10,784,512 | B2 | 9/2020 | Sakshaug et al. |
| 10,814,304 | B2 | 10/2020 | Costantino et al. |
| 10,923,722 | B2 | 2/2021 | Sakshaug et al. |

(56) References Cited

U.S. PATENT DOCUMENTS

| | | | |
|---|---|---|---|
| 11,401,363 | B2 | 8/2022 | Geramita et al. |
| 11,437,621 | B2 | 9/2022 | Sakshaug et al. |
| 11,495,793 | B2 | 11/2022 | Sakshaug et al. |
| 11,495,798 | B1 | 11/2022 | Sakshaug et al. |
| 2001/0002086 | A1 | 5/2001 | Webb |
| 2002/0031706 | A1 | 3/2002 | Dasgupta et al. |
| 2002/0031710 | A1 | 3/2002 | Kezuka et al. |
| 2002/0036885 | A1 | 3/2002 | Lee et al. |
| 2002/0075627 | A1 | 6/2002 | Shinozaki et al. |
| 2002/0104474 | A1 | 8/2002 | Wakamatsu et al. |
| 2002/0114126 | A1 | 8/2002 | Hirahara et al. |
| 2002/0122985 | A1 | 9/2002 | Sato et al. |
| 2002/0168314 | A1 | 11/2002 | Roemmler |
| 2002/0172637 | A1 | 11/2002 | Chesneau et al. |
| 2003/0012722 | A1 | 1/2003 | Liu |
| 2003/0013606 | A1 | 1/2003 | Hampden-Smith et al. |
| 2003/0013804 | A1 | 1/2003 | Phillips et al. |
| 2003/0064564 | A1 | 4/2003 | Lin |
| 2003/0108785 | A1 | 6/2003 | Wu et al. |
| 2003/0170548 | A1 | 9/2003 | Otsuki et al. |
| 2004/0010090 | A1 | 1/2004 | Chino et al. |
| 2004/0106040 | A1 | 6/2004 | Fukuoka et al. |
| 2004/0132845 | A1 | 7/2004 | Rhine et al. |
| 2004/0141963 | A1 | 7/2004 | Umekawa |
| 2004/0180264 | A1 | 9/2004 | Honbo et al. |
| 2004/0182711 | A1 | 9/2004 | Liang et al. |
| 2004/0201567 | A1 | 10/2004 | Yu et al. |
| 2004/0241237 | A1 | 12/2004 | Pirard et al. |
| 2004/0248730 | A1 | 12/2004 | Kim et al. |
| 2004/0248790 | A1 | 12/2004 | Hinuma et al. |
| 2005/0014643 | A1 | 1/2005 | Lini et al. |
| 2005/0041370 | A1 | 2/2005 | Wilk et al. |
| 2005/0058589 | A1 | 3/2005 | Lundquist et al. |
| 2005/0058907 | A1 | 3/2005 | Kurihara et al. |
| 2005/0079349 | A1 | 4/2005 | Hampden-Smith et al. |
| 2005/0079359 | A1 | 4/2005 | Fujita et al. |
| 2005/0135993 | A1 | 6/2005 | Xu et al. |
| 2005/0153130 | A1 | 7/2005 | Long et al. |
| 2005/0196336 | A1 | 9/2005 | Chatterjee et al. |
| 2005/0221981 | A1 | 10/2005 | Wagh et al. |
| 2005/0233195 | A1 | 10/2005 | Arnold et al. |
| 2005/0250011 | A1 | 11/2005 | Mitchell et al. |
| 2005/0253220 | A1 | 11/2005 | Lin et al. |
| 2005/0266990 | A1 | 12/2005 | Iwasaki et al. |
| 2005/0282062 | A1 | 12/2005 | Manako et al. |
| 2006/0008408 | A1 | 1/2006 | Ho Yoon et al. |
| 2006/0057355 | A1 | 3/2006 | Suzuki et al. |
| 2006/0078682 | A1 | 4/2006 | McDaniel et al. |
| 2006/0079587 | A1 | 4/2006 | Albert et al. |
| 2006/0093915 | A1 | 5/2006 | Lundquist et al. |
| 2006/0223965 | A1 | 10/2006 | Trifu |
| 2006/0240979 | A1 | 10/2006 | Hirahara et al. |
| 2007/0002523 | A1 | 1/2007 | Ando |
| 2007/0008677 | A1 | 1/2007 | Zhong et al. |
| 2007/0048605 | A1 | 3/2007 | Pez et al. |
| 2007/0104981 | A1 | 5/2007 | Lam et al. |
| 2007/0142222 | A1 | 6/2007 | Erkey et al. |
| 2007/0166602 | A1 | 7/2007 | Burchardt |
| 2008/0011986 | A1 | 1/2008 | Yamakawa et al. |
| 2008/0044726 | A1 | 2/2008 | Feng et al. |
| 2008/0107804 | A1 | 5/2008 | Kondo |
| 2008/0112876 | A1 | 5/2008 | Dailey |
| 2008/0132632 | A1 | 6/2008 | Schiraldi et al. |
| 2008/0145757 | A1 | 6/2008 | Mah et al. |
| 2008/0145761 | A1 | 6/2008 | Petrat et al. |
| 2008/0201925 | A1 | 8/2008 | Zhong et al. |
| 2008/0204973 | A1 | 8/2008 | Zhong et al. |
| 2008/0206638 | A1 | 8/2008 | Takahashi et al. |
| 2008/0241640 | A1 | 10/2008 | Rajeshwar et al. |
| 2008/0268297 | A1 | 10/2008 | Quayle et al. |
| 2008/0293911 | A1 | 11/2008 | Qureshi et al. |
| 2008/0297981 | A1 | 12/2008 | Endo et al. |
| 2008/0299456 | A1 | 12/2008 | Shiga et al. |
| 2009/0035344 | A1 | 2/2009 | Thomas et al. |
| 2009/0053594 | A1 | 2/2009 | Johnson et al. |
| 2009/0087660 | A1 | 4/2009 | Suzuki et al. |
| 2009/0097189 | A1 | 4/2009 | Tasaki et al. |
| 2009/0104509 | A1 | 4/2009 | Kwak et al. |
| 2009/0104530 | A1 | 4/2009 | Shizuka et al. |
| 2009/0114544 | A1 | 5/2009 | Rousseau et al. |
| 2009/0117466 | A1 | 5/2009 | Zhamu et al. |
| 2009/0145482 | A1 | 6/2009 | Mitzi et al. |
| 2009/0185327 | A1 | 7/2009 | Seymour |
| 2009/0213529 | A1 | 8/2009 | Gogotsi et al. |
| 2009/0253248 | A1 | 10/2009 | Sun et al. |
| 2009/0286160 | A1 | 11/2009 | Kozono et al. |
| 2009/0305131 | A1 | 12/2009 | Kumar et al. |
| 2010/0008021 | A1 | 1/2010 | Hu et al. |
| 2010/0047671 | A1 | 2/2010 | Chiang et al. |
| 2010/0051881 | A1 | 3/2010 | Ahn et al. |
| 2010/0092370 | A1 | 4/2010 | Zhang et al. |
| 2010/0097741 | A1 | 4/2010 | Zhong et al. |
| 2010/0098615 | A1 | 4/2010 | Tennison et al. |
| 2010/0110613 | A1 | 5/2010 | Zhong et al. |
| 2010/0143798 | A1 | 6/2010 | Zhamu et al. |
| 2010/0163791 | A1 | 7/2010 | Fukui et al. |
| 2010/0215563 | A1 | 8/2010 | Yambayashi |
| 2010/0279172 | A1 | 11/2010 | Hwang et al. |
| 2010/0285359 | A1 | 11/2010 | Hwang et al. |
| 2010/0288970 | A1 | 11/2010 | Watanabe et al. |
| 2010/0310941 | A1 | 12/2010 | Kumta et al. |
| 2010/0316907 | A1 | 12/2010 | Yamamoto et al. |
| 2011/0027648 | A1 | 2/2011 | Rolison et al. |
| 2011/0053765 | A1 | 3/2011 | Feaver et al. |
| 2011/0111284 | A1 | 5/2011 | Maeshima et al. |
| 2011/0151324 | A1 | 6/2011 | Chiang et al. |
| 2011/0159375 | A1 | 6/2011 | Feaver et al. |
| 2011/0177393 | A1 | 7/2011 | Park et al. |
| 2011/0200848 | A1 | 8/2011 | Chiang et al. |
| 2011/0281180 | A1 | 11/2011 | Kim et al. |
| 2011/0287189 | A1 | 11/2011 | Shembel |
| 2011/0300447 | A1 | 12/2011 | Archer |
| 2011/0311873 | A1 | 12/2011 | Schultz et al. |
| 2012/0045685 | A1 | 2/2012 | Seki et al. |
| 2012/0100438 | A1 | 4/2012 | Fasching et al. |
| 2012/0115033 | A1 | 5/2012 | Kim et al. |
| 2012/0129049 | A1 | 5/2012 | Rayner |
| 2012/0156493 | A1 | 6/2012 | Maisels et al. |
| 2012/0156567 | A1 | 6/2012 | Ayme-Perrot et al. |
| 2012/0164531 | A1 | 6/2012 | Chen et al. |
| 2012/0183856 | A1 | 7/2012 | Cui et al. |
| 2012/0196186 | A1 | 8/2012 | Richard |
| 2012/0241691 | A1 | 9/2012 | Soneda et al. |
| 2012/0251876 | A1 | 10/2012 | Jagannathan |
| 2012/0262127 | A1 | 10/2012 | Feaver et al. |
| 2012/0264020 | A1 | 10/2012 | Burton et al. |
| 2012/0305651 | A1 | 12/2012 | Anderson et al. |
| 2012/0308870 | A1 | 12/2012 | Okuda et al. |
| 2012/0321959 | A1 | 12/2012 | Yushin et al. |
| 2013/0082213 | A1 | 4/2013 | Duncan et al. |
| 2013/0169238 | A1 | 7/2013 | Rojeski |
| 2013/0189472 | A1 | 7/2013 | Takaoka |
| 2013/0189575 | A1 | 7/2013 | Anguchamy et al. |
| 2013/0196158 | A1 | 8/2013 | Yoshida et al. |
| 2013/0209348 | A1 | 8/2013 | Ludvik et al. |
| 2013/0211005 | A1 | 8/2013 | Ludvik et al. |
| 2013/0244862 | A1 | 9/2013 | Ivanovici et al. |
| 2013/0252082 | A1 | 9/2013 | Thompkins et al. |
| 2013/0295462 | A1 | 11/2013 | Atanassova et al. |
| 2013/0337334 | A1 | 12/2013 | Tao et al. |
| 2013/0344363 | A1 | 12/2013 | Upadhyaya |
| 2013/0344391 | A1 | 12/2013 | Yushin et al. |
| 2014/0038042 | A1 | 2/2014 | Rios et al. |
| 2014/0057179 | A1 | 2/2014 | Yushin et al. |
| 2014/0170482 | A1 | 6/2014 | Park et al. |
| 2014/0272592 | A1 | 9/2014 | Thompkins et al. |
| 2014/0287317 | A1 | 9/2014 | Tiquet et al. |
| 2014/0302396 | A1 | 10/2014 | Lu et al. |
| 2014/0335410 | A1 | 11/2014 | Loveridge et al. |
| 2015/0037249 | A1 | 2/2015 | Fu |
| 2015/0087731 | A1 | 3/2015 | Dong et al. |
| 2015/0155546 | A1 | 6/2015 | Yushin et al. |
| 2015/0162603 | A1 | 6/2015 | Yushin et al. |
| 2015/0207148 | A1 | 7/2015 | Kimura et al. |

(56) References Cited

U.S. PATENT DOCUMENTS

| | | | | |
|---|---|---|---|---|
| 2015/0238917 | A1 | 8/2015 | Mulik et al. | |
| 2015/0280243 | A1* | 10/2015 | Park | H01M 10/653 429/246 |
| 2015/0306570 | A1 | 10/2015 | Mayes et al. | |
| 2016/0010250 | A1 | 1/2016 | Taninaka et al. | |
| 2016/0036035 | A1* | 2/2016 | Hayner | H01M 4/131 252/502 |
| 2016/0039970 | A1 | 2/2016 | Kron et al. | |
| 2016/0043384 | A1 | 2/2016 | Zhamu et al. | |
| 2016/0104882 | A1 | 4/2016 | Yushin et al. | |
| 2016/0133394 | A1 | 5/2016 | Sakshaug et al. | |
| 2016/0344030 | A1 | 11/2016 | Sakshaug et al. | |
| 2016/0372750 | A1 | 12/2016 | Chang et al. | |
| 2017/0316888 | A1 | 11/2017 | Geramita et al. | |
| 2018/0097240 | A1 | 4/2018 | Feaver et al. | |
| 2018/0294484 | A1 | 10/2018 | Fredrick et al. | |
| 2019/0088931 | A1 | 3/2019 | Abrahamson et al. | |
| 2019/0097222 | A1 | 3/2019 | Feaver et al. | |
| 2019/0103608 | A1 | 4/2019 | Costantino et al. | |
| 2019/0144287 | A1 | 5/2019 | Park et al. | |
| 2019/0259546 | A1 | 8/2019 | Kron et al. | |
| 2020/0020935 | A1 | 1/2020 | Costantino et al. | |
| 2020/0048098 | A1 | 2/2020 | Feaver et al. | |
| 2020/0144619 | A1 | 5/2020 | Hamilton et al. | |
| 2020/0259178 | A1 | 8/2020 | Chang et al. | |
| 2020/0259181 | A1 | 8/2020 | Thompkins et al. | |
| 2020/0280070 | A1 | 9/2020 | Sakshaug et al. | |
| 2020/0290882 | A1 | 9/2020 | Fredrick et al. | |
| 2021/0054213 | A1 | 2/2021 | Costantino et al. | |
| 2021/0057736 | A1 | 2/2021 | Feaver et al. | |
| 2021/0175498 | A1 | 6/2021 | Feaver et al. | |
| 2021/0237029 | A1 | 8/2021 | Costantino et al. | |
| 2022/0389146 | A1 | 12/2022 | Geramita et al. | |
| 2023/0016325 | A1 | 1/2023 | Geramita et al. | |
| 2023/0022154 | A1 | 1/2023 | Geramita et al. | |
| 2024/0384398 | A1* | 11/2024 | Yilmaz | C23C 16/045 |

FOREIGN PATENT DOCUMENTS

| | | | |
|---|---|---|---|
| CN | 1877888 | A | 12/2006 |
| CN | 1986401 | A | 6/2007 |
| CN | 101284665 | A | 10/2008 |
| CN | 101292389 | A | 10/2008 |
| CN | 101318648 | A | 12/2008 |
| CN | 101604743 | A | 12/2009 |
| CN | 101292389 | B | 9/2010 |
| CN | 101969120 | A | 2/2011 |
| CN | 102082262 | A | 6/2011 |
| CN | 102214817 | A | 10/2011 |
| CN | 102623680 | A | 8/2012 |
| CN | 102820455 | A | 12/2012 |
| CN | 103094528 | A | 5/2013 |
| CN | 103456929 | A | 12/2013 |
| CN | 103746098 | A | 4/2014 |
| CN | 104108698 | A | 10/2014 |
| CN | 102509781 | B | 11/2015 |
| CN | 105680023 | A | 6/2016 |
| CN | 106207108 | A | 12/2016 |
| DE | 10 2014 211012 | A1 | 12/2015 |
| EP | 0 126 191 | A2 | 11/1984 |
| EP | 0 649 815 | A1 | 4/1995 |
| EP | 0 861 804 | A1 | 9/1998 |
| EP | 0 891 943 | A1 | 1/1999 |
| EP | 1 049 116 | A1 | 11/2000 |
| EP | 1 052 716 | A2 | 11/2000 |
| EP | 1 514 859 | A2 | 3/2005 |
| EP | 2 117 068 | A1 | 11/2009 |
| EP | 2 330 676 | A1 | 6/2011 |
| EP | 2 983 186 | A1 | 2/2016 |
| JP | 2-300222 | A | 12/1990 |
| JP | 3-90615 | A | 4/1991 |
| JP | H3-137010 | A | 6/1991 |
| JP | 4-59806 | A | 2/1992 |
| JP | 4-139174 | A | 5/1992 |
| JP | 5-117493 | A | 5/1993 |
| JP | 5-156121 | A | 6/1993 |
| JP | 5-311512 | A | 11/1993 |
| JP | 5-320955 | A | 12/1993 |
| JP | 8-59919 | A | 3/1996 |
| JP | 8-112539 | A | 5/1996 |
| JP | 9-63905 | A | 3/1997 |
| JP | 9-275042 | A | 10/1997 |
| JP | 10-297912 | A | 11/1998 |
| JP | 2001-89119 | A | 4/2001 |
| JP | 2001-278609 | A | 10/2001 |
| JP | 2003100284 | A | 4/2003 |
| JP | 2003-303588 | A | 10/2003 |
| JP | 2004-67498 | A | 3/2004 |
| JP | 2004-203715 | A | 7/2004 |
| JP | 2004-221332 | A | 8/2004 |
| JP | 2004-315283 | A | 11/2004 |
| JP | 2005-132696 | A | 5/2005 |
| JP | 2005-136397 | A | 5/2005 |
| JP | 2005135925 | A | 5/2005 |
| JP | 2005-187320 | A | 7/2005 |
| JP | 2006-117475 | A | 5/2006 |
| JP | 2006-160597 | A | 6/2006 |
| JP | 2006-248848 | A | 9/2006 |
| JP | 2006-264993 | A | 10/2006 |
| JP | 2007-039289 | A | 2/2007 |
| JP | 2007-115749 | A | 5/2007 |
| JP | 2008-7387 | A | 1/2008 |
| JP | 2008-8539 | A | 1/2008 |
| JP | 2008-94925 | A | 4/2008 |
| JP | 2008186732 | A | 8/2008 |
| JP | 2009-259803 | A | 11/2009 |
| JP | 2012-121796 | A | 6/2012 |
| JP | 5339107 | B1 | 11/2013 |
| JP | 2015-130287 | A | 7/2015 |
| JP | 5796263 | B1 | 10/2015 |
| JP | 2016-27222 | A | 2/2016 |
| JP | 2016-100225 | A | 5/2016 |
| JP | 2016-100226 | A | 5/2016 |
| JP | 2016-132608 | A | 7/2016 |
| KR | 10-2004-0080010 | A | 9/2004 |
| KR | 10-2007-0030881 | A | 3/2007 |
| KR | 10-2014-0112451 | A | 9/2014 |
| WO | 95/01165 | A1 | 1/1995 |
| WO | WO 0149604 | A1 | 7/2001 |
| WO | 02/39468 | A2 | 5/2002 |
| WO | 2004/087285 | A1 | 10/2004 |
| WO | 2004/099073 | A2 | 11/2004 |
| WO | 2005/043653 | A1 | 5/2005 |
| WO | WO 2007136164 | A1 | 11/2007 |
| WO | 2009/032104 | A2 | 3/2009 |
| WO | 2010/138760 | A2 | 12/2010 |
| WO | 2011/157013 | A1 | 12/2011 |
| WO | WO 2011154692 | A1 | 12/2011 |
| WO | WO 2014031929 | A1 | 2/2014 |

OTHER PUBLICATIONS

Knieke et al., "Identifying the apparent and true grinding limit," *Powder Technology 195*:25-30, 2009 [Published online May 20, 2009]. (6 pages).

"A Basic Guide to Particle Characterization," Malvern Instruments Worldwide—White Paper, Retrieved from the Internet: URL:http://golik.co.il/Data/ABasicGuidtoParticleCharacterization(2) 1962085150.pdf, XP55089322A, 2012. (26 Pages).

"Chemical Basics of Polymer Insulation Materials: 3.6 Implementation Method of Stepwise Polymerization," in Changming Li (eds.), *HITP Harbin Institute of Technology Press*, 2007, pp. 73 (With English Translation) (4 Pages).

"Determination of density by volumetric displacement—Skeleton density by gas pycnometry," International Standard 1(ISO 12154):2014, (17 pages).

Abánades et al., "Experimental Analysis of Direct Thermal Methane Cracking," *International Journal of Hydrogen Energy 36*(20):12877-12886, 2011.

Abraham et al., "A Polymer Electrolyte-Based Rechargeable Lithium/Oxygen Battery," *J. Electrochem. Soc. 143*(1):1-5, Jan. 1996.

(56) References Cited

OTHER PUBLICATIONS

Alcañiz-Monge et al., "Methane Storage in Activated Carbon Fibres," *Carbon 35*(2):291-297, 1997.
Alias et al., "Silicon/graphite nanocomposite electrodes prepared by low pressure chemical vapor deposition," *Journal of Power Sources 174*:900-904, 2007.
Anderegg, "Grading Aggregates: II—The Application of Mathematical Formulas to Mortars," *Industrial and Engineering Chemistry 23*(9):1058-1064, 1931.
Andreasen et al., "Ueber die Beziehung zwischen Kornabstufung und Zwischenraum in Produkten aus losen Körnern (mit einigen Experimenten)," *Kolloid-Zeitschrift 50*(3):217-228, Mar. 1930, with translation of summary. (17 pages).
Babić et al., "Carbon cryogel as support of platinum nano-sized electrocatalyst for the hydrogen oxidation reaction," *Electrochimica Acta 51*:3820-3826, 2006.
Babić et al., "Characterization of carbon cryogel synthesized by sol-gel polycondensation and freeze-drying," *Carbon 42*:2617-2624, 2004.
Babić et al., "Characterization of carbon cryogels synthesized by sol-gel polycondensation," *J. Serb. Chem. Soc. 70*(1):21-31, 2005.
Barbieri et al., "Capacitance limits of high surface area activated carbons for double layer capacitors," *Carbon 43*:1303-1310, 2005.
Barton et al., "Tailored Porous Materials," *Chem. Mater. 11*:2633-2656, 1999.
Beattie et al., "High-Capacity Lithium-Air Cathodes," *J. Electrochem. Soc. 156*(1):A44-A47, 2009.
Besenhard, "Handbook of battery materials," Weinheim, Wiley—VCH, Weinheim, New York, 398-401, Dec. 31, 1999.
Bock et al., "Structural Investigation of Resorcinol Formaldehyde and Carbon Aerogels Using SAXS and BET," *Journal of Porous Materials 4*:287-294, 1997.
Buiel et al., "Li-insertion in hard carbon anode materials for Li-ion batteries," *Electrochimica Acta 45*:121-130, 1999.
Burchell et al., "Low Pressure Storage of Natural Gas for Vehicular Applications," *The Engineering Society for Advancing Mobility Land Sea Air and Space, Government/Industry Meeting*, Washington D.C., Jun. 19-21, 2000, 7 pages.
Cao et al., "Li-ion capacitors with carbon cathode and hard carbon/stabilized lithium metal powder anode electrodes," *Journal of Power Sources 213*:180-185, Apr. 2012.
Chmiola et al., "Anomalous Increase in Carbon Capacitance at Pore Sizes Less Than 1 Nanometer," *Science 313*:1760-1763, Sep. 22, 2006.
Conway et al., "Partial Molal Volume of Tetraalkylammonium Halides and Assignment of Individual Ionic Contributions," *Trans. Faraday Soc. 62*:2738-2749, 1966.
Coppey et al., "Fluidized Bed Chemical Vapor Deposition of Silicon on Carbon Nanotubes for Li-Ion Batteries," *Journal of Nanoscience and Nanotechnology 11*(9):8392-8395, 2011.
Czakkel et al., "Influence of drying on the morphology of resorcinol-formaldehyde-based carbon gels," *Microporous and Mesoporous Materials 86*:124-133, 2005.
Débart et al., "α-MnO2 Nanowires: A Catalyst for the O2 Electrode in Rechargeable Lithium Batteries," *Agnew. Chem. Int. Ed. 47*:4521-4524, 2008.
Ding et al., "How Conductivities and Viscosities of PC-DEC and PC-EC Solutions of LiBF4, LiPF6, LiBOB, Et4NBF4, and Et4NBF6 Differ and Why," *Journal of The Electrochemical Society 151*(12):A2007-A2015, 2004.
Dinger et al., "Particle Packing III—Discrete versus Continuous Particle Sizes," *Interceram 41*(5):332-334, 1992.
Dinger et al., "Particle Packing IV—Computer Modelling of Particle Packing Phenomena," *Interceram 42*(3):150-152, 1993.
Edward, "Molecular Volumes and the Stokes-Einstein Equation," *Journal of Chemical Education 47*(4):261-270, Apr. 1970.
Eikerling et al., "Optimized Structure of Nanoporous Carbon-Based Double-Layer Capacitors," *Journal of The Electrochemical Society 152*(1):E24-E33, 2005.
Endo et al., "Morphology and organic EDLC applications of chemically activated AR-resin-based carbons," *Carbon 40*:2613-2626, 2002.
Feaver et al., "Activated carbon cryogels for low pressure methane storage," *Carbon 44*:590-593, 2006.
Fotouhi et al., "A Low Cost, Disposable Cable-Shaped Al-Air Battery for Portable Biosensors," *J. Micromech. Microeng. 26*:055011, 2016. (8 pages).
Fraas, "Using vibrations in fluidized beds For processes that do not require a high flow rate of sweep gas, the complex-mode vibration fluidized bed offers lower power needs, attrition rates, and elutriation rates than gas-fluidized beds or rotary kilns," *Mechanical Engineering*:76-79, Jan. 7, 1998.
Furnas, "Grading Aggregates I—Mathematical Relations for Beds of Broken Solids of Maximum Density," *Industrial and Engineering Chemistry 23*(9):1052-1058, 1931.
Gao et al., "Nitrogen-rich graphene from small molecules as high performance anode material," *Nanotechnology 25*:415402, 2014, 8 pages.
Hahn et al., "A dilatometric study of the voltage limitation of carbonaceous electrodes in aprotic EDLC type electrolytes by charge-induced strain," *Carbon 44*:2523-2533, 2006.
Hasegawa et al., "Preparation of carbon gel microspheres containing silicon powder for lithium ion battery anodes," *Carbon 42*:2573-2579, 2004.
Hirscher et al., "Are carbon nanostructures an efficient hydrogen storage medium?" *Journal of Alloys and Compounds 356-357*:433-437, 2003.
Hogness et al. "The Thermal Decomposition of Silane," *J. Am. Chem. Soc. 58*(1):108-112, 1936.
Hong et al., "Hydrogen evolution inhibition with diethylenetriamine modification of activated carbon for a lead-acid battery," *RSC Adv. 4*:33574-33577, 2014.
Hsieh et al., "Synthesis of mesoporous carbon composite and its electric double-layer formation behavior," *Microporous and Mesoporous Materials 93*:232-239, 2006.
Hu et al., "Effects of electrolytes and electrochemical pretreatments on the capacitive characteristics of activated carbon fabrics for supercapacitors," *Journal of Power Sources 125*:299-308, 2004.
Huang et al., "Nitrogen-containing mesoporous carbons prepared from melamine formaldehyde resins with $CaCl_2$ as a template," *J. Colloid Interface Sci. 363*(1):193-198, 2011.
Indo German Carbons Limited, "Activated Carbon," Apr. 2009, URL=http://www.igcl.com/php/activated_carbon.php, download date Nov. 29, 2018, 3 pages.
Inomata et al., "Natural gas storage in activated carbon pellets without a binder," *Carbon 40*:87-93, 2002.
Job et al., "Carbon aerogels, cryogels and xerogels: Influence of the drying method on the textural properties of porous carbon materials," *Carbon 43*:2481-2494, 2005.
Job et al., "Highly dispersed platinum catalysts prepared by impregnation of texture-tailored carbon xerogels," *Journal of Catalysis 240*:160-171, 2006.
Job et al., "Synthesis of transition metal-doped carbon xerogels by solubilization of metal salts in resorcinol-formaldehyde aqueous solution," *Carbon 42*:3217-3227, 2004.
Katsaros et al., "Preparation and characterisation of gas selective microporous carbon membranes," *Microporous and Mesoporous Materials 99*:181-189, 2007.
Kim et al., "Correlation between the capacitor performance and pore structure," *Tanso 221*:31-39, 2006 (English Abstract).
Kim et al., "Adsorption of phenol and reactive dyes from aqueous solution on carbon cryogel microspheres with controlled porous structure," *Microporous and Mesoporous Materials 96*:191-196, 2006.
Kocklenberg et al., "Texture control of freeze-dried resorcinol-formaldehyde gels," *Journal of Non-Crystalline Solids 225*:8-13, 1998.
Kowalczyk et al., "Estimation of the pore-size distribution function from the nitrogen adsorption isotherm. Comparison of density functional theory and the method of Do and co-workers," *Carbon 41*:1113-1125, 2003.

(56) References Cited

OTHER PUBLICATIONS

Lozano-Castelló et al., "Influence of pore structure and surface chemistry on electric double layer capacitance in non-aqueous electrolyte," *Carbon 41*:1765-1775, 2003.
Lozano-Castelló et al., "Powdered Activated Carbons and Activated Carbon Fibers for Methane Storage: A Comparative Study," *Energy & Fuels 16*:1321-1328, 2002.
McEwen et al., "Nonaqueous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status Of Present Commercial Devices," Proceedings of the 8th International Seminar on Double Layer Capacitors and Similar Energy Storage Devices, Deerfield Beach, Florida, Dec. 7-9, 1998, 9 pages.
Naoi et al., "Second generation 'nanohybrid supercapacitor': Evolution of capacitive energy storage devices," *Energy Environ. Sci. 5*:9363-9373, 2012.
Nishihara et al., "Preparation of resorcinol—formaldehyde carbon cryogel microhoneycombs," *Carbon 42*:899-901, 2004.
Ogasawara et al., "Rechargeable LI2O2 Electrode for Lithium Batteries," *Journal of the American Chemical Society 128*(4):1390-1393, 2006.
Otowa et al., "Production and adsorption characteristics of MAXSORB: High-surface-area active carbon," *Gas Separation and Purification 7*(4):241-245, 1993.
Pääkkö, "Long and entangled native cellulose I nanofibers allow flexible aerogels and hierarchically porous templates for functionalities," *Soft Matter 4*:2492-2499, 2008.
Pekala et al., "Aerogels derived from multifunctional organic monomers," *Journal of Non-Crystalline Solids 145*:90-98, 1992.
Pekala et al., "Structure of Organic Aerogels. 1. Morphology and Scaling," *Macromolecules 26*:5487-5493, 1993.
Pekala, "Organic aerogels from the polycondensation of resorcinol with formaldehyde," *Journal of Materials Science 24*:3221-3227, 1989.
Perrin et al., "Methane Storage within Dry and Wet Active Carbons: A Comparative Study," *Energy & Fuels 17*:1283-1291, 2003.
Pimenta et al., "Studying disorder in graphite-based systems by Raman spectroscopy," *Phys. Chem. Chem. Phys. 9*:1276-1291, 2007.
Pojanavaraphan et al., "Prevulcanized natural rubber latex/clay aerogel nanocomposites," *European Polymer Journal 44*:1968-1977, 2008.
Qu et al., "Studies of activated carbons used in double-layer capacitors," *Journal of Power Sources 74*:99-107, 1998.
Ravikovitch et al., "Unified Approach to Pore Size Characterization of Microporous Carbonaceous Materials from N2, Ar, and CO2 Adsorption Isotherms," *Langmuir 16*:2311-2320, 2000.
Read, "Ether-Based Electrolytes for the Lithium/Oxygen Organic Electrolyte Battery," *J. Electrochem. Soc. 153*(1):A96-A100, 2006.
Read et al., "Oxygen Transport Properties of Organic Electrolytes and Performance of Lithium/Oxygen Battery," *J. Electrochem. Soc. 150*(10):A1351-A1356, 2003.
Read, "Characterization of the Lithium/Oxygen Organic Electrolyte Battery," *J. Electrochemical Soc. 149*(9):A1190-A1195, 2002.
Reichenauer et al., "Microporosity in carbon aerogels," *Journal of Non-Crystalline Solids 225*:210-214, 1998.
Salitra et al., "Carbon Electrodes for Double-Layer Capacitors I. Relations Between Ion and Pore Dimensions," *Journal of The Electrochemical Society 147*(7):2486-2493, 2000.
Setoyama et al., "Simulation Study On The Relationship Between A High Resolution αs-Plot And The Pore Size Distribution For Activated Carbon," *Carbon 36*(10):1459-1467, 1998.
Simon et al., "Materials for electrochemical capacitors," *Nature Materials 7*:845-854, Nov. 2008.
Sivakkumar et al., "Evaluation of Lithium-ion capacitors assembled with pre-lithiated graphite anode and activated carbon cathode," *Electrochimica Acta 65*:280-287, Jan. 2012.
Takeuchi et al., "Removal of single component chlorinated hydrocarbon vapor by activated carbon of very high surface area," *Separation and Purification Technology 15*:79-90, 1999.
Tamon et al., "Influence of freeze-drying conditions on the mesoporosity of organic gels as carbon precursors," *Carbon 38*:1099-1105, 2000.
Tamon et al., "Preparation of mesoporous carbon by freeze drying," *Carbon 37*:2049-2055, 1999.
Tonanon et al., "Influence of surfactants on porous properties of carbon cryogels prepared by sol-gel polycondensation of resorcinol and formaldehyde," *Carbon 41*:2981-2990, 2003.
Toyo Tanso Carbon Products, "Special Graphite and Compound Material Products," Toyo Tanso Co., Ltd. Catalog published 2008.
Toyo Tanso, "Graphite Applications," Toyo Tanso Co., Ltd. Catalog published 1998. (Machine Translation Attached).
Toyo Tanso, "Isotropic Graphite Engineering Data," Toyo Tanso Co., Ltd. Catalog published 1994.
Toyo Tanso, "Isotropic Graphite Technical Data," Toyo Tanso Co., Ltd. Catalog published 1997.
Ue, "Mobility and Ionic Association of Lithium and Quaternary Ammonium Salts in Propylene Carbonate and γ-Butyrolactone," *J. Electrochem. Soc. 141*(12):3336-3342, Dec. 1994.
Webb, "Volume and Density Determinations for Particle Technologists," Micromeritics Instrument Corp., Feb. 16, 2001, Retrieved from http://www.micormeritics.com/pdf/app_articles/density_determinations.pdf (15 pages).
WebElements, "Lead: the essentials," attached as a PDF showing the webpage availability date as of Aug. 14, 2009 (via the Wayback Machine), web URL is http://www.webelements.com/lead/, pp. 1-3.
Wei et al., "A novel electrode material for electric double-layer capacitors," *Journal of Power Sources 141*:386-391, 2005.
Williford et al., "Air electrode design for sustained high power operation of Li/air batteries," *Journal of Power Sources 194*:1164-1170, 2009.
Woo et al., "Silicon Embedded Nanoporous Carbon Composite for the Anode of Li Ion Batteries," *Journal of The Electrochemical Society 159*(8): A1273-A1277, 2012.
Wu et al., "Fabrication and nano-structure control of carbon aerogels via a microemulsion-templated sol-gel polymerization method," *Carbon 44*:675-681, 2006.
Xiang et al., "Beneficial effects of activated carbon additives on the performance of negative lead-acid battery electrode for high-rate partial-state-of-charge operation," *Journal of Power Sources 241*:150-158, 2013.
Xie et al., "Pore size control of Pitch-based activated carbon fibers by pyrolytic deposition of propylene," *Applied Surface Science 250*:152-160, 2005.
Xu et al., "Comparison of sizing small particles using different technologies," *Powder Technology 132*:145-153, 2003.
Xu et al., "Optimization of Nonaqueous Electrolytes for Primary Lithium/Air Batteries Operated in Ambient Environment," *Journal of the Electrochemical Society 156*(10):A773-A779, 2009.
Xu et al., "Synthesis of mesoporous carbon and its adsorption property to biomolecules," *Microporous and Mesoporous Materials 115*:461-468, 2008.
Yamamoto et al., "Porous properties of carbon gel microspheres as adsorbents for gas separation," *Carbon 42*:1671-1676, 2004.
Yamamoto et al., "Control of mesoporosity of carbon gels prepared by sol-gel polycondensation and freeze drying," *Journal of Non-Crystalline Solids 288*:46-55, 2001.
Yamamoto et al., "Preparation and characterization of carbon cryogel microspheres," *Carbon 40*:1345-1351, 2002.
Yang et al., "Preparation of highly microporous and mesoporous carbon from the mesophase pitch and its carbon foams with KOH," *Carbon 42*:1872-1875, 2004.
Zhang et al., "Discharge characteristic of non-aqueous electrolyte Li/O2 battery," *Journal of Power Sources 195*:1235-1240, 2010.
Zhao et al., "Highly-Ordered Mesoporous Carbon Nitride with Ultrahigh Surface Area and Pore Volume as a Superior Dehydrogenation Catalyst," *Chem. Mater. 26*(10):3151-3161, 2014.

(56) References Cited

OTHER PUBLICATIONS

Zhang et al., "Highly Reversible and Large Lithium Storage in Mesoporous Si/C Nanocomposite Anodes with Silicon Nanoparticles Embedded in a Carbon Framework," Adv. Mater. 26:6749-6755, 2014.

* cited by examiner

Figure 1. Relationship between Z and average Coulombic efficiency for various silicon-carbon composite materials.
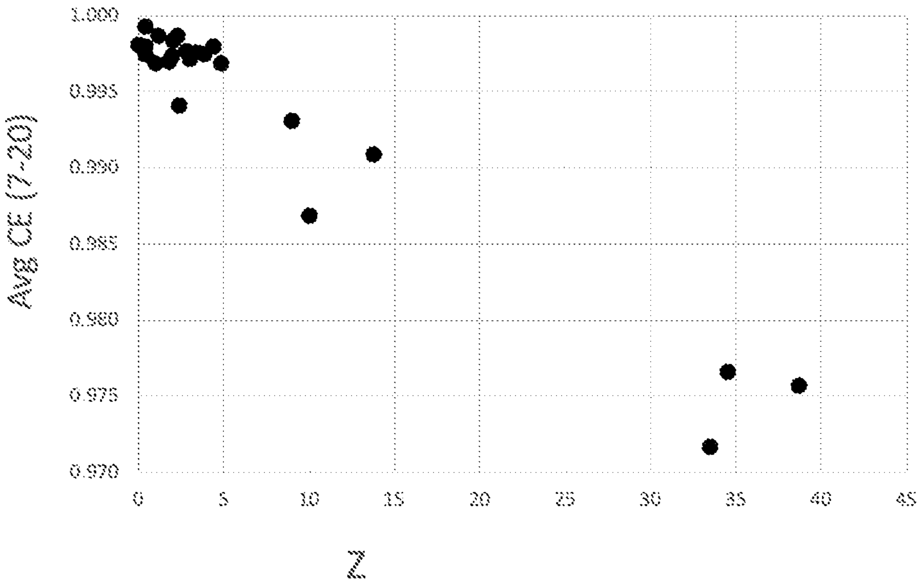

Figure 2. Differential capacity vs voltage plot for Silicon-Carbon Composite 3 from 2nd cycle using a half-cell.
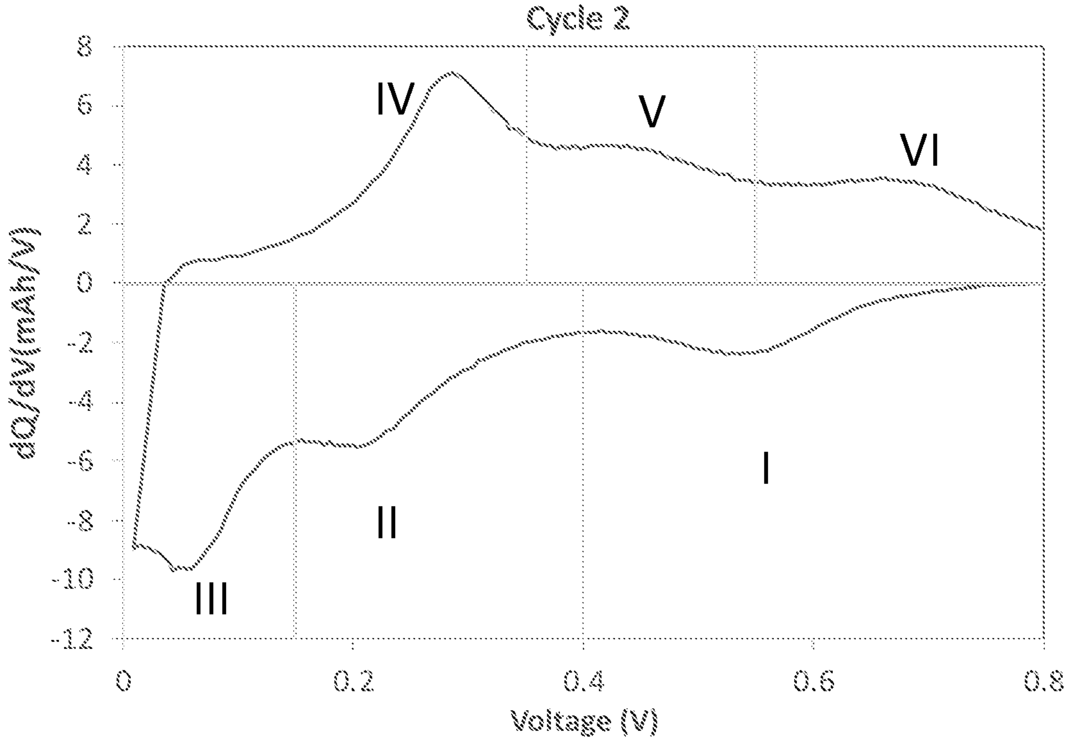

Figure 3. Differential capacity vs voltage plot for Silicon-Carbon Composite 3 from 2nd cycle to 5th cycle using a half-cell.
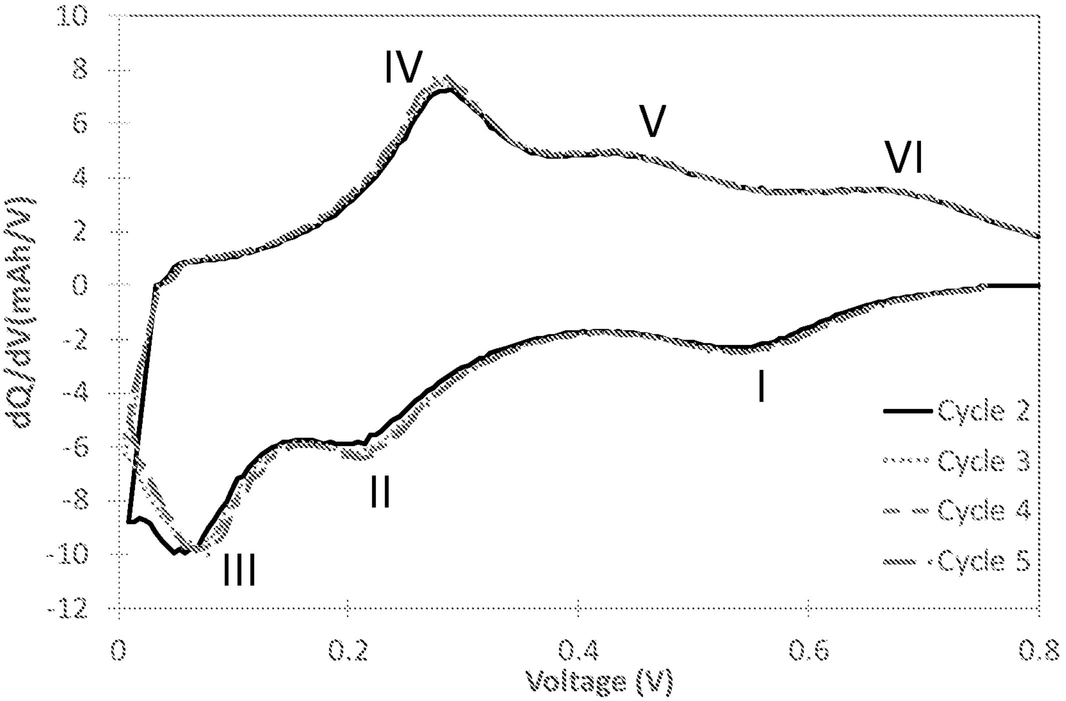

Figure 4. dQ/dV vs V plot for various silicon-carbon composite materials.
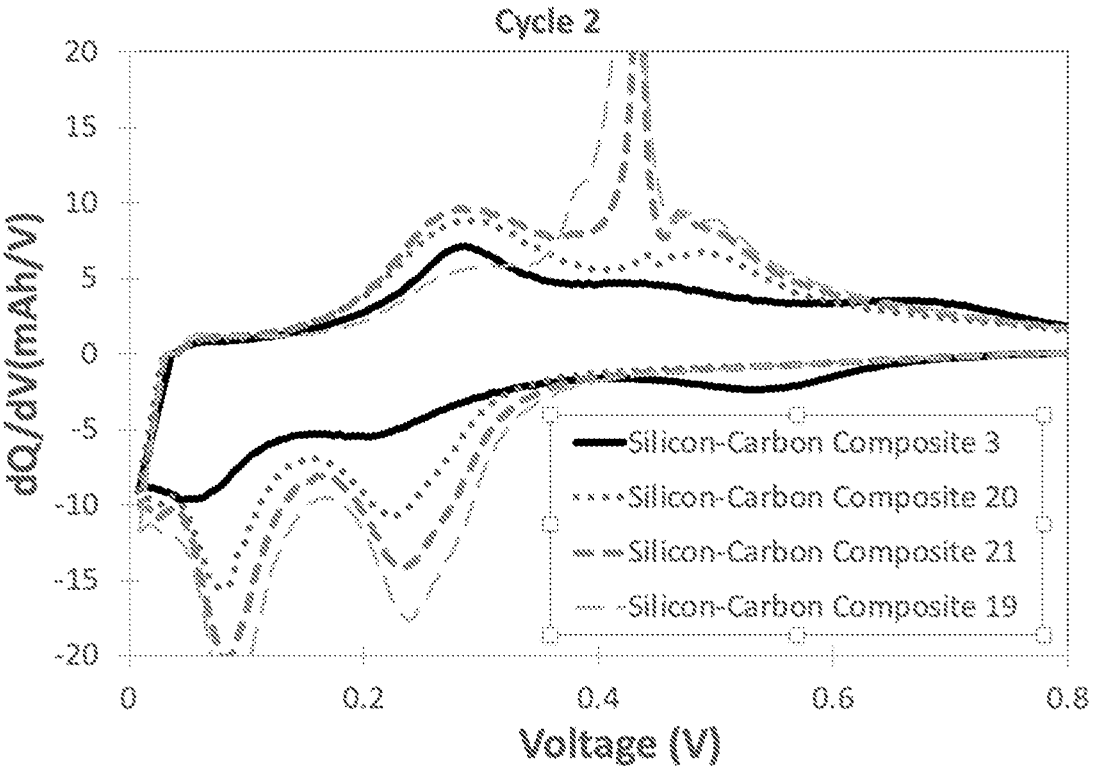

Figure 5. Example of calculation of φ for Silicon-Carbon Composite 3.
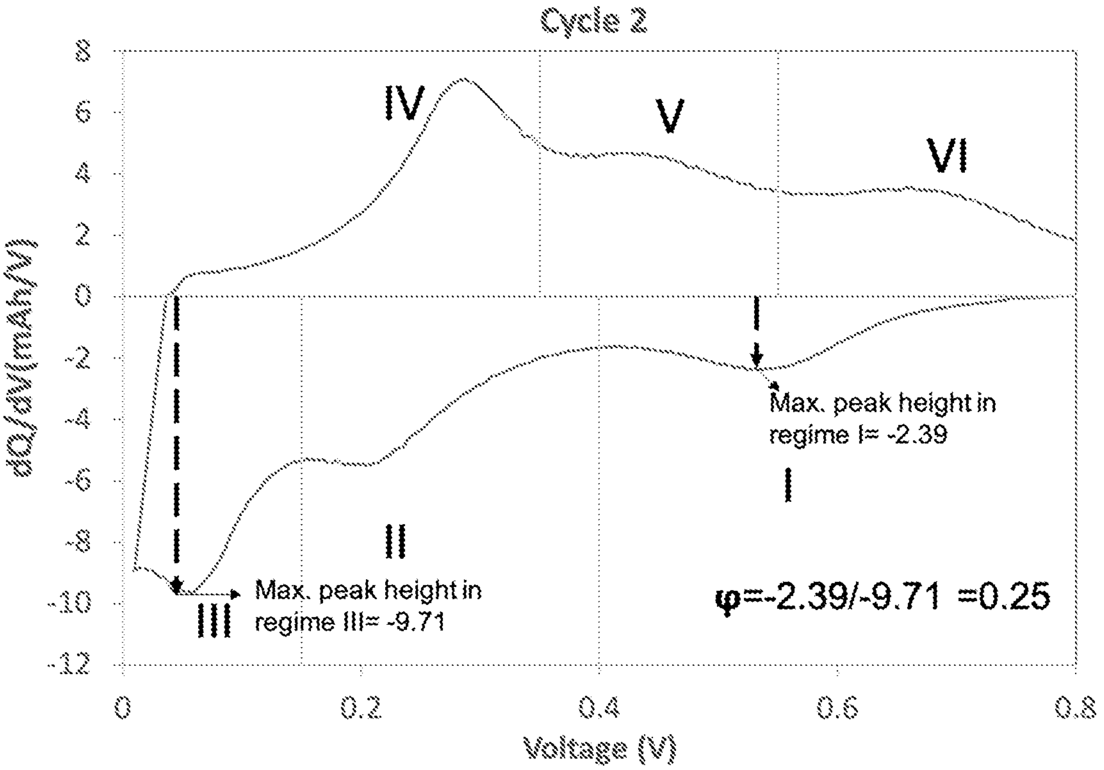

Figure 6. Z vs φ plot for various silicon-carbon composite materials.
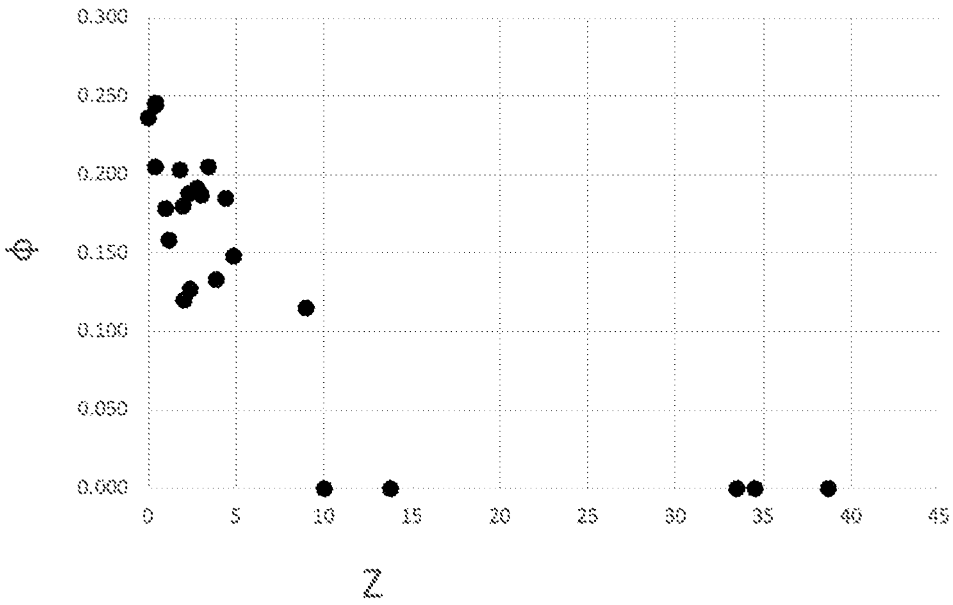

SILICON CARBON COMPOSITES COMPRISING ULTRA LOW Z

BACKGROUND

Technical Field

Embodiments of the present invention generally relate to silicon-carbon composite materials with properties that overcome the challenges for providing amorphous nano-sized silicon entrained within porous carbon. Said silicon-carbon composites are produced via chemical infiltration chemical vapor infiltration to impregnate amorphous, nano-sized silicon within the pores of a porous scaffold. Suitable porous scaffolds include, but are not limited to, porous carbon scaffolds, for example carbon having a pore volume comprising micropores (less than 2 nm), mesopores (2 to 50 nm), and/or macropores (greater than 50 nm). Suitable precursors for the carbon scaffold include, but are not limited to, sugars and polyols, organic acids, phenolic compounds, cross-linkers, and amine compounds. Suitable compositing materials include, but are not limited to, silicon materials. Precursors for the silicon include, but are not limited to, silicon containing gases such as silane, high-order silanes (such as di-, tri-, and/or tetrasilane), and/or chlorosilane(s) (such as mono-, di-, tri-, and tetrachlorosilane) and mixtures thereof. Chemical vapor infiltration (CVI) of silicon into the pores of porous scaffold materials is accomplished by exposing said porous scaffold to silicon-containing gas (e.g., silane) at elevated temperatures. The porous carbon scaffold can be a particulate porous carbon.

A key outcome in this regard is to achieve the desired form of silicon in the desired form, namely amorphous nano-sized silicon. Furthermore, another key outcome is to achieve the silicon impregnation within the pores of the porous carbon. Such materials, for example, silicon-carbon composite materials, have utiliuty as anode materials for energy storage devices, for example lithium ion batteries.

Description of the Related Art

CVI is a process wherein a gaseous substrate reacts within a porous scaffold material. This approach can be employed to produce composite materials, for instance silicon-carbon composites, wherein a silicon-containing gas decomposes at elevated temperature within a porous carbon scaffold. While this approach can be employed to manufacture a variety of composite materials, there is particular interest in silicon-carbon (Si—C) composite materials. Such Si—C composite materials have utility, for example as energy storage materials, for example as an anode material within a lithium ion battery (LIB). LIBs have potential to replace devices currently used in any number of applications. For example, current lead acid automobile batteries are not adequate for next generation all-electric and hybrid electric vehicles due to irreversible, stable sulfate formations during discharge. Lithium ion batteries are a viable alternative to the lead-based systems currently used due to their capacity, and other considerations.

To this end, there is continued strong interest in developing new LIB anode materials, particularly silicon, which has 10-fold higher gravimetric capacity than conventional graphite. However, silicon exhibits large volume change during cycling, in turn leading to electrode deterioration and solid-electrolyte interphase (SEI) instability. The most common amelioration approach is to reduce silicon particle size, for instance $D_{V50}$<150 nm, for instance $D_{V50}$<100 nm, for instance $D_{V50}$<50 nm, for instance $D_{V50}$<20 nm, for instance $D_{V50}$<10 nm, for instance $D_{V50}$<5 nm, for instance $D_{V50}$<2 nm, either as discrete particles or within a matrix. Thus far, techniques for creating nano-scale silicon involve high-temperature reduction of silicon oxide, extensive particle diminution, multi-step toxic etching, and/or other cost prohibitive processes. Likewise, common matrix approaches involve expensive materials such as graphene or nano-graphite, and/or require complex processing and coating.

It is known from scientific literature that non-graphitizable (hard) carbon is beneficial as a LIB anode material (Liu Y, Xue, J S, Zheng T, Dahn, JR. Carbon 1996, 34:193-200; Wu, YP, Fang, SB, Jiang, Y Y. 1998, 75:201-206; Buiel E, Dahn JR. Electrochim Acta 1999 45:121-130). The basis for this improved performance stems from the disordered nature of the graphene layers that allows Li-ions to intercalate on either side of the graphene plane allowing for theoretically double the stoichiometric content of Li ions versus crystalline graphite. Furthermore, the disordered structure improves the rate capability of the material by allowing Li ions to intercalate isotropically as opposed to graphite where lithiation can only proceed in parallel to the stacked graphene planes. Despite these desirable electrochemical properties, amorphous carbons have not seen wide-spread deployment in commercial Li-ion batteries, owing primarily to low FCE and low bulk density (<1 g/cc). Instead, amorphous carbon has been used more commonly as a low-mass additive and coating for other active material components of the battery to improve conductivity and reduce surface side reactions.

In recent years, amorphous carbon as a LIB battery material has received considerable attention as a coating for silicon anode materials. Such a silicon-carbon core-shell structure has the potential for not only improving conductivity, but also buffering the expansion of silicon as it lithiates, thus stabilizing its cycle stability and minimizing problems associated with particle pulverization, isolation, and SEI integrity (Jung, Y, Lee K, Oh, S. Electrochim Acta 2007 52:7061-7067; Zuo P, Yin G, Ma Y. Electrochim Acta 2007 52:4878-4883; Ng S H, Wang J, Wexler D, Chew S Y, Liu H K. J Phys Chem C 2007 111:11131-11138). Problems associated with this strategy include the lack of a suitable silicon starting material that is amenable to the coating process, and the inherent lack of engineered void space within the carbon-coated silicon core-shell composite particle to accommodate expansion of the silicon during lithiation. This inevitably leads to cycle stability failure due to destruction of core-shell structure and SEI layer (Beattie S D, Larcher D, Morcrette M, Simon B, Tarascon, J-M. J Electrochem Soc 2008 155: A158-A163).

An alternative to core shell structure is a structure wherein amorophous, nano-sized silicon is homogeously distributed within the porosity of a porous carbon scaffold. The porous carbon allows for desirable properties: (i) carbon porosity provides void volume to accommodate the expansion of silicon during lithiation thus reducing the net composite particle expansion at the electrode level; (ii) the disordered graphene network provides increased electrical conductivity to the silicon thus enabling faster charge/discharge rates, (iii) nano-pore structure acts as a template for the synthesis of silicon thereby dictating its size, distribution, and morphology.

To this end, the desired inverse hierarchical structure can be achieved by employing CVI wherein a silicon-containing gas can completely permeate nanoporous carbon and decompose therein to nano-sized silicon. The CVI approach confers several advantages in terms of silicon structure. One advantage is that nanoporous carbon provides nucleation sites for growing silicon while dictating maximum particle shape and size. Confining the growth of silicon within a nano-porous structure affords reduced susceptibility to cracking or pulverization and loss of contact caused by expansion. Moreover, this structure promotes nano-sized silicon to remain as amorphous phase. This property provides the opportunity for high charge/discharge rates, particularly in combination with silicon's vicinity within the conductive carbon scaffold. This system provides a high-rate-capable, solid-state lithium diffusion pathway that directly delivers lithium ions to the nano-scale silicon interface. Another benefit of the silicon provide via CVI within the carbon scaffold is the inhibition of formation of undesirable crystalline $Li_{15}Si_4$ phase. Yet another benefit is that the CVI process provides for void space within the particle interior.

In order to gauge relative amount of silicon impregnated into the porosity of the porous carbon, thermogravimetric analysis (TGA) may be employed. TGA can be employed to assess the fraction of silicon residing within the porosity of porous carbon relative to the total silicon present, i.e., sum of silicon within the porosity and on the particle surface. As the silicon-carbon composite is heated under air, the sample exhibits a mass increase that intiates at about 300° C. to 500° C. that reflects initial oxidation of silicon to $SiO_2$, and then the sample exhibits a mass loss as the carbon is burned off, and then the sample exhibits mass increase reflecting resumed conversion of silicon into $SiO_2$ which increases towards an asymptotic value above 1000° C. as silicon oxidizes to completion. For purposes of this analysis, it is assumed that any mass increase above 800° C. corresponds to the oxidation of silicon to $SiO_2$ and that the total mass at completion of oxidation is $SiO_2$. This allows a percentage of unoxidized silicon at 800° C. as a proportion of the total amount of silicon to be determined using the formula:

$$Z=1.875\times[(M1100-M800)/M1100]\times100$$

where Z is the percentage of unoxidized silicon at 800° C., M1100 is the mass of the sample at completion of oxidation at a temperature of 1100° C., and M800 is the mass of the sample at 800° C. Without being bound by theory, the temperature at which silicon is oxidized under TGA conditions relates to the length scale of the oxide coating on the silicon due to the diffusion of oxygen atoms through the oxide layer. Thus, silicon residing within the carbon porosity will oxidize at a lower temperature than deposits of silicon on a particle surface due to the necessarily thinner coating existing on these surfaces. In this fashion, silicon oxidation above 800° C. is used to quantitatively assess the fraction of silicon not impregnated within the porosity of the porous carbon scaffold.

BRIEF SUMMARY

Silicon-carbon composite materials and related processes are disclosed that overcome the challenges for providing amorphous nano-sized silicon entrained within porous carbon. Compared to other, inferior materials and processes described in the prior art, the materials and processes disclosed herein find superior utility in various applications, including energy storage devices such as lithium ion batteries.

BRIEF DESCRIPTION OF THE DRAWINGS

FIG. 1. Relationship between Z and average Coulombic efficiency for various silicon-carbon composite materials.

FIG. 2. Differential capacity vs voltage plot for Silicon-Carbon Composite 3 from $2^{nd}$ cycle using a half-cell.

FIG. 3. Differential capacity vs voltage plot for Silicon-Carbon Composite 3 from $2^{nd}$ cycle to $5^{th}$ cycle using a half-cell.

FIG. 4. dQ/dV vs V plot for various silicon-carbon composite materials.

FIG. 5. Example of Calculation of o for Silicon-Carbon Composite 3.

FIG. 6. Z vs φ plot for various silicon-carbon composite materials.

DETAILED DESCRIPTION

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

A. Porous Scaffold Materials

For the purposes of embodiments of the current invention, a porous scaffold may be used, into which silicon is to be impregnated. In this context, the porous scaffold can comprise various materials. In some embodiments the porous scaffold material primarily comprises carbon, for example hard carbon. Other allotropes of carbon are also envisioned in other embodiments, for example, graphite, amorphous carbon, diamond, C60, carbon nanotubes (e.g., single and/or multi-walled), graphene and/or carbon fibers. The introduction of porosity into the carbon material can be achieved by a variety of means. For instance, the porosity in the carbon material can be achieved by modulation of polymer precursors, and/or processing conditions to create said porous carbon material, and described in detail in the subsequent section.

In other embodiments, the porous scaffold comprises a polymer material. To this end, a wide variety of polymers are envisioned in various embodiments to have utility, including, but not limited to, inorganic polymer, organic polymers, and addition polymers. Examples of inorganic polymers in this context includes, but are not limited to homochain polymers of silicon-silicon such as polysilanes, silicon carbide, polygermanes, and polystannanes. Additional examples of inorganic polymers includes, but are not limited to, heterochain polymers such as polyborazylenes, polysiloxanes like polydimethylsiloxane (PDMS), polymethylhydrosiloxane (PMHS) and polydiphenylsiloxane, polysilazanes like perhydridopolysilazane (PHPS), polyphosphazenes and poly(dichlorophosphazenes), polyphosphates, polythiazyls, and polysulfides. Examples of organic polymers includes, but are not limited to, low density polyethylene (LDPE), high density polyethylene (HDPE), polypropylene (PP), polyvinyl chloride (PVC), polystyrene (PS), nylon, nylon 6, nylon 6,6, teflon (Polytetrafluoroethylene), thermoplastic polyurethanes (TPU), polyureas, poly(lactide), poly(glycolide) and combinations thereof, phenolic resins, polyamides, polyaramids, polyethylene terephthalate, polychloroprene, polyacrylonitrile, polyaniline, polyimide, poly(3,4-ethylenedioxythiophene) polystyrene sulfonate (PDOT:PSS), and others known in the arts. The organic polymer can be synthetic or natural in origin. In some embodiments, the polymer is a polysaccharide, such as starch, cellulose, cellobiose, amylose, amylpectin, gum Arabic, lignin, and the like. In some embodiments, the polysaccharide is derived from the carmelization of mono- or oligomeric sugars, such as fructose, glucose, sucrose, maltose, raffinose, and the like.

In certain embodiments, the porous scaffold polymer material comprises a coordination polymer. Coordination polymers in this context include, but are not limited to, metal organic frameworks (MOFs). Techniques for production of MOFs, as well as exemplary species of MOFs, are known and described in the art ("The Chemistry and Applications of Metal-Organic Frameworks, Hiroyasu Furukawa et al. Science 341, (2013); DOI: 10.1126/science. 1230444). Examples of MOFs in the context include, but are not limited to, Basolite™ materials and zeolitic imidazolate frameworks (ZIFs).

Concomitant with the myriad variety of polymers envisioned with the potential to provide a porous substrate, various processing approaches are envisioned in various embodiments to achieve said porosity. In this context, general methods for imparting porosity into various materials are myriad, as known in the art, including, but certainly not limited to, methods involving emulsification, micelle creation, gasification, dissolution followed by solvent removal (for example, lyophilization), axial compaction and sintering, gravity sintering, powder rolling and sintering, isostatic compaction and sintering, metal spraying, metal coating and sintering, metal injection molding and sintering, and the like. Other approaches to create a porous polymeric material, including creation of a porous gel, such as a freeze dried gel, aerogel, and the like are also envisioned.

In certain embodiments, the porous scaffold material comprises a porous ceramic material. In certain embodiments, the porous scaffold material comprises a porous ceramic foam. In this context, general methods for imparting porosity into ceramic materials are varied, as known in the art, including, but certainly not limited to, creation of porous In this context, general methods and materials suitable for comprising the porous ceramic include, but are not limited to, porous aluminum oxide, porous zirconia toughened alumina, porous partially stabilized zirconia, porous alumina, porous sintered silicon carbide, sintered silicon nitride, porous cordierite, porous zirconium oxide, clay-bound silicon carbide, and the like.

In certain embodiments, the porous scaffold comprises porous silica or other silicon material containing oxygen. The creation of silicon gels, including sol gels, and other porous silica materials is known in the art.

In certain embodiments, the porous material comprises a porous metal. Suitable metals in this regard include, but are not limited to porous aluminum, porous steel, porous nickel, porous Inconcel, porous Hasteloy, porous titanium, porous copper, porous brass, porous gold, porous silver, porous germanium, and other metals capable of being formed into porous structures, as known in the art. In some embodiments, the porous scaffold material comprises a porous metal foam. The types of metals and methods to manufacture related to same are known in the art. Such methods include, but are not limited to, casting (including foaming, infiltration, and lost-foam casting), deposition (chemical and physical), gas-eutectic formation, and powder metallurgy techniques (such as powder sintering, compaction in the presence of a foaming agent, and fiber metallurgy techniques).

B. Porous Carbon Scaffold

Methods for preparing porous carbon materials from polymer precursors are known in the art. For example, methods for preparation of carbon materials are described in U.S. Pat. Nos. 7,723,262, 8,293,818, 8,404,384, 8,654,507, 8,916,296, 9,269,502, 10,590,277, and U.S. patent application Ser. No. 16/745,197, the full disclosures of which are hereby incorporated by reference in their entireties for all purposes.

Accordingly, in one embodiment the present disclosure provides a method for preparing any of the carbon materials or polymer gels described above. The carbon materials may be synthesized through pyrolysis of either a single precursor, for example a saccharide material such as sucrose, fructose, glucose, dextrin, maltodextrin, starch, amylopectin, amylose, lignin, gum Arabic, and other saccharides known in the art, and combinations thereof. Alternatively, the carbon materials may be synthesized through pyrolysis of a complex resin, for instance formed using a sol-gel method using polymer precursors such as phenol, resorcinol, bisphenol A, urea, melamine, and other suitable compounds known in the art, and combinations thereof, in a suitable solvent such as water, ethanol, methanol, and other solvents known in the art, and combinations thereof, with cross-linking agents such as formaldehyde, hexamethylenetetramine, furfural, and other cross-lining agents known in the art, and combinations thereof. The resin may be acid or basic, and may contain a catalyst. The catalyst may be volatile or non-volatile. The pyrolysis temperature and dwell time can vary as known in the art.

In some embodiments, the methods comprise preparation of a polymer gel by a sol gel process, condensation process or crosslinking process involving monomer precursor(s) and a crosslinking agent, two existing polymers and a crosslinking agent or a single polymer and a crosslinking agent, followed by pyrolysis of the polymer gel. The polymer gel may be dried (e.g., freeze dried) prior to pyrolysis; however drying is not necessarily required.

The target carbon properties can be derived from a variety of polymer chemistries provided the polymerization reaction produces a resin/polymer with the necessary carbon backbone. Different polymer families include novolacs, resoles, acrylates, styrenics, ureathanes, rubbers (neoprenes, styrene-butadienes, etc.), nylons, etc. The preparation of any of these polymer resins can occur via a number of different processes including sol gel, emulsion/suspension, solid state, solution state, melt state, etc for either polymerization and crosslinking processes.

In some embodiments an electrochemical modifier is incorporated into the material as polymer. For example, the organic or carbon containing polymer, RF for example, is copolymerized with the polymer, which contains the electrochemical modifier. In one embodiment, the electrochemical modifier-containing polymer contains silicon. In one embodiment the polymer is tetraethylorthosiliane (TEOS). In one embodiment, a TEOS solution is added to the RF solution prior to or during polymerization. In another embodiment the polymer is a polysilane with organic side groups. In some cases these side groups are methyl groups, in other cases these groups are phenyl groups, in other cases the side chains include phenyl, pyrol, acetate, vinyl, siloxane fragments. In some cases the side chain includes a group 14 element (silicon, germanium, tin or lead). In other cases the side chain includes a group 13 element (boron, aluminum, boron, gallium, indium). In other cases the side chain includes a group 15 element (nitrogen, phosphorous, arsenic). In other cases the side chain includes a group 16 element (oxygen, sulfur, selenium).

In another embodiment the electrochemical modifier comprises a silole. In some cases it is a phenol-silole or a silafluorene. In other cases it is a poly-silole or a poly-silafluorene. In some cases the silicon is replaced with germanium (germole or germafluorene), tin (stannole or stannaflourene) nitrogen (carbazole) or phosphorous (phosphole, phosphafluorene). In all cases the heteroatom containing material can be a small molecule, an oligomer or a polymer. Phosphorous atoms may or may not be also bonded to oxygen.

In some embodiments the reactant comprises phosphorous. In certain other embodiments, the phosphorus is in the form of phosphoric acid. In certain other embodiments, the phosphorus can be in the form of a salt, wherein the anion of the salt comprises one or more phosphate, phosphite, phosphide, hydrogen phosphate, dihydrogen phosphate, hexafluorophosphate, hypophosphite, polyphosphate, or pyrophosphate ions, or combinations thereof. In certain other embodiments, the phosphorus can be in the form of a salt, wherein the cation of the salt comprises one or more phosphonium ions. The non-phosphate containing anion or cation pair for any of the above embodiments can be chosen for those known and described in the art. In the context, exemplary cations to pair with phosphate-containing anions include, but are not limited to, ammonium, tetraethylammonium, and tetramethylammonium ions. In the context, exemplary anions to pair with phosphate-containing cations include, but are not limited to, carbonate, dicarbonate, and acetate ions.

In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

In still other embodiments, the method comprises admixing an acid. In certain embodiments, the acid is a solid at room temperature and pressure. In some embodiments, the acid is a liquid at room temperature and pressure. In some embodiments, the acid is a liquid at room temperature and pressure that does not provide dissolution of one or more of the other polymer precursors.

The acid may be selected from any number of acids suitable for the polymerization process. For example, in some embodiments the acid is acetic acid and in other embodiments the acid is oxalic acid. In further embodiments, the acid is mixed with the first or second solvent in a ratio of acid to solvent of 99:1, 90:10, 75:25, 50:50, 25:75, 20:80, 10:90 or 1:90. In other embodiments, the acid is acetic acid and the first or second solvent is water. In other embodiments, acidity is provided by adding a solid acid.

The total content of acid in the mixture can be varied to alter the properties of the final product. In some embodiments, the acid is present from about 1% to about 50% by weight of mixture. In other embodiments, the acid is present from about 5% to about 25%. In other embodiments, the acid is present from about 10% to about 20%, for example about 10%, about 15% or about 20%.

In certain embodiments, the polymer precursor components are blended together and subsequently held for a time and at a temperature sufficient to achieve polymerization. One or more of the polymer precursor components can have particle size less than about 20 mm in size, for example less than 10 mm, for example less than 7 mm, for example, less than 5 mm, for example less than 2 mm, for example less than 1 mm, for example less than 100 microns, for example less than 10 microns. In some embodiments, the particle size of one or more of the polymer precursor components is reduced during the blending process.

The blending of one or more polymer precursor components in the absence of solvent can be accomplished by methods described in the art, for example ball milling, jet milling, Fritsch milling, planetary mixing, and other mixing methodologies for mixing or blending solid particles while controlling the process conditions (e.g., temperature). The mixing or blending process can be accomplished before, during, and/or after (or combinations thereof) incubation at the reaction temperature. Reaction parameters include aging the blended mixture at a temperature and for a time sufficient for the one or more polymer precursors to react with each other and form a polymer. In this respect, suitable aging temperature ranges from about room temperature to temperatures at or near the melting point of one or more of the polymer precursors. In some embodiments, suitable aging temperature ranges from about room temperature to temperatures at or near the glass transition temperature of one or more of the polymer precursors. For example, in some embodiments the solvent free mixture is aged at temperatures from about 20° C. to about 600° C., for example about 20° C. to about 500° C., for example about 20° C. to about 400° C., for example about 20° C. to about 300° C., for example about 20° C. to about 200° C. In certain embodiments, the solvent free mixture is aged at temperatures from about 50 to about 250° C.

The reaction duration is generally sufficient to allow the polymer precursors to react and form a polymer, for example the mixture may be aged anywhere from 1 hour to 48 hours, or more or less depending on the desired result. Typical embodiments include aging for a period of time ranging from about 2 hours to about 48 hours, for example in some embodiments aging comprises about 12 hours and in other embodiments aging comprises about 4-8 hours (e.g., about 6 hours).

In certain embodiments, an electrochemical modifier is incorporated during the above described polymerization process. For example, in some embodiments, an electrochemical modifier in the form of metal particles, metal paste, metal salt, metal oxide or molten metal can be dissolved or suspended into the mixture from which the gel resin is produced Exemplary electrochemical modifiers for producing composite materials may fall into one or more than one of the chemical classifications. In some embodiments, the electrochemical modifier is a lithium salt, for example, but not limited to, lithium fluoride, lithium chloride, lithium carbonate, lithium hydroxide, lithium benzoate, lithium bromide, lithium formate, lithium hexafluorophosphate, lithium iodate, lithium iodide, lithium perchlorate, lithium phosphate, lithium sulfate, lithium tetraborate, lithium tetrafluoroborate, and combinations thereof.

In certain embodiments, the electrochemical modifier comprises a metal, and exemplary species includes, but are not limited to aluminum isoproproxide, manganese acetate, nickel acetate, iron acetate, tin chloride, silicon chloride, and combinations thereof. In certain embodiments, the electrochemical modifier is a phosphate compound, including but not limited to phytic acid, phosphoric acid, ammonium dihydrogenphosphate, and combinations thereof. In certain embodiments, the electrochemical modifier comprises silicon, and exemplary species includes, but are not limited to silicon powders, silicon nanotubes, polycrystalline silicon, nanocrystalline silicon, amorpohous silicon, porous silicon, nano sized silicon, nano-featured silicon, nano-sized and nano-featured silicon, silicyne, and black silicon, and combinations thereof.

Electrochemical modifiers can be combined with a variety of polymer systems through either physical mixing or chemical reactions with latent (or secondary) polymer functionality. Examples of latent polymer functionality include, but are not limited to, epoxide groups, unsaturation (double and triple bonds), acid groups, alcohol groups, amine groups, basic groups. Crosslinking with latent functionality can occur via heteroatoms (e.g. vulcanization with sulfur, acid/base/ring opening reactions with phosphoric acid), reactions with organic acids or bases (described above), coordination to transition metals (including but not limited to Ti, Cr, Mn, Fe, Co, Ni, Cu, Zn, Zr, Nb, Mo, Ag, Au), ring opening or ring closing reactions (rotaxanes, spiro compounds, etc).

Electrochemical modifiers can also be added to the polymer system through physical blending. Physical blending can include but is not limited to melt blending of polymers and/or co-polymers, the inclusion of discrete particles, chemical vapor deposition of the electrochemical modifier and coprecipitation of the electrochemical modifier and the main polymer material.

In some instances the electrochemical modifier can be added via a metal salt solid, solution, or suspension. The metal salt solid, solution or suspension may comprise acids and/or alcohols to improve solubility of the metal salt. In yet another variation, the polymer gel (either before or after an optional drying step) is contacted with a paste comprising the electrochemical modifier. In yet another variation, the polymer gel (either before or after an optional drying step) is contacted with a metal or metal oxide sol comprising the desired electrochemical modifier.

In addition to the above exemplified electrochemical modifiers, the composite materials may comprise one or more additional forms (i.e., allotropes) of carbon. In this regard, it has been found that inclusion of different allotropes of carbon such as graphite, amorphous carbon, conductive carbon, carbon black, diamond, C60, carbon nanotubes (e.g., single and/or multi-walled), graphene and/or carbon fibers into the composite materials is effective to optimize the electrochemical properties of the composite materials. The various allotropes of carbon can be incorporated into the carbon materials during any stage of the preparation process described herein. For example, during the solution phase, during the gelation phase, during the curing phase, during the pyrolysis phase, during the milling phase, or after milling. In some embodiments, the second carbon form is incorporated into the composite material by adding the second carbon form before or during polymerization of the polymer gel as described in more detail herein. The polymerized polymer gel containing the second carbon form is then processed according to the general techniques described herein to obtain a carbon material containing a second allotrope of carbon.

In a preferred embodiment, the carbon is produced from precursors with little of no solvent required for processing (solven free). The structure of the polymer precursors suitable for use in a low solvent or essentially solvent free reaction mixture is not particularly limited, provided that the polymer precursor is capable of reacting with another polymer precursor or with a second polymer precursor to form a polymer. Polymer precursors include amine-containing compounds, alcohol-containing compounds and carbonyl-containing compounds, for example in some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

In one embodiment employing a low or essentially solvent free reaction mixture, the method comprises use of a first and second polymer precursor, and in some embodiments the first or second polymer precursor is a carbonyl containing compound and the other of the first or second polymer precursor is an alcohol containing compound. In some embodiments, a first polymer precursor is a phenolic compound and a second polymer precursor is an aldehyde compound (e.g., formaldehyde). In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. In some embodiments, the polymer precursors are alcohols and carbonyl compounds (e.g., resorcinol and aldehyde) and they are present in a ratio of about 0.5:1.0, respectively.

The polymer precursor materials suitable for low or essentially solvent free reaction mixture as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Other suitable compounds in this regard are bisphenols, for instance, bisphenol A. Mixtures of two or more polyhydroxy benzenes can also be used. Phenol (monohydroxy benzene) can also be used. Representative polyhydroxy compounds include sugars, such as glucose, sucrose, fructose, chitin and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3 butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor in the low or essentially solvent free reaction mixture is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

In other embodiments, the polymer precursor in the low or essentially solvent free reaction mixture is a urea or an amine containing compound. For example, in some embodiments the polymer precursor is urea, melamine, hexamethylenetetramine (HMT) or combination thereof. Other embodiments include polymer precursors selected from isocyanates or other activated carbonyl compounds such as acid halides and the like.

Some embodiments of the disclosed methods include preparation of low or solvent-free polymer gels (and carbon materials) comprising electrochemical modifiers. Such electrochemical modifiers include, but are not limited to nitrogen, silicon, and sulfur. In other embodiments, the electrochemical modifier comprises fluorine, iron, tin, silicon, nickel, aluminum, zinc, or manganese. The electrochemical modifier can be included in the preparation procedure at any step. For example, in some the electrochemical modifier is admixed with the mixture, the polymer phase or the continuous phase.

The blending of one or more polymer precursor components in the absence of solvent can be accomplished by methods described in the art, for example ball milling, jet milling, Fritsch milling, planetary mixing, and other mixing methodologies for mixing or blending solid particles while controlling the process conditions (e.g., temperature). The mixing or blending process can be accomplished before, during, and/or after (or combinations thereof) incubation at the reaction temperature.

Reaction parameters include aging the blended mixture at a temperature and for a time sufficient for the one or more polymer precursors to react with each other and form a polymer. In this respect, suitable aging temperature ranges from about room temperature to temperatures at or near the melting point of one or more of the polymer precursors. In some embodiments, suitable aging temperature ranges from about room temperature to temperatures at or near the glass transition temperature of one or more of the polymer precursors. For example, in some embodiments the solvent free mixture is aged at temperatures from about 20° C. to about 600° C., for example about 20° C. to about 500° C., for example about 20° C. to about 400° C., for example about 20° C. to about 300° C., for example about 20° C. to about 200° C. In certain embodiments, the solvent free mixture is aged at temperatures from about 50 to about 250° C.

The porous carbon material can be achieved via pyrolysis of a polymer produced from precursors materials as described above. In some embodiments, the porous carbon material comprises an amorphous activated carbon that is produced by pyrolysis, physical or chemical activation, or combination thereof in either a single process step or sequential process steps.

The temperature and dwell time of pyrolysis can be varied, for example the dwell time van vary from 1 min to 10 min, from 10 min to 30 min, from 30 min to 1 hour, for 1 hour to 2 hours, from 2 hours to 4 hours, from 4 hours to 24 h. The temperature can be varied, for example, the pyrolysis temperature can vary from 200 to 300 C, from 250 to 350 C, from 350 C to 450 C, from 450 C to 550 C, from 540 C to 650 C, from 650 C to 750 C, from 750 C to 850 C, from 850 C to 950 C, from 950 C to 1050 C, from 1050 C to 1150 C, from 1150 C to 1250 C. The pyrolysis can be accomplished in an inert gas, for example nitrogen, or argon.

In some embodiments, an alternate gas is used to further accomplish carbon activation. In certain embodiments, pyrolysis and activation are combined. Suitable gases for accomplioshing carbon activation include, but are not limited to, carbon dioxide, carbon monoxide, water (steam), air, oxygen, and further combinations thereof. The temperature and dwell time of activation can be varied, for example the dwell time van vary from 1 min to 10 min, from 10 min to 30 min, from 30 min to 1 hour, for 1 hour to 2 hours, from 2 hours to 4 hours, from 4 hours to 24 h. The temperature can be varied, for example, the pyrolysis temperature can vary from 200 to 300 C, from 250 to 350 C, from 350 C to 450 C, from 450 C to 550 C, from 540 C to 650 C, from 650 C to 750 C, from 750 C to 850 C, from 850 C to 950 C, from 950 C to 1050 C, from 1050 C to 1150 C, from 1150 C to 1250 C.

Either prior to the pyrolysis, and/or after pyrolysis, and/or after activation, the carbon may be subjected to a particle size reduction. The particle size reduction can be accomplished by a variety of techniques known in the art, for example by jet milling in the presence of various gases including air, nitrogen, argon, helium, supercritical steam, and other gases known in the art. Other particle size reduction methods, such as grinding, ball milling, jet milling, water jet milling, and other approaches known in the art are also envisioned.

The porous carbon saffold may be in the form of particles. The particle size and particle size distribution can be measured by a variety of techniques known in the art, and can be described based on fractional volume. In this regard, the Dv50 of the carbon scaffold may be between 10 nm and 10 mm, for example between 100 nm and 1 mm, for example between 1 μm and 100 μm, for example between 2 μm and 50 μm, example between 3 μm and 30 μm, example between 4 μm and 20 μm, example between 5 μm and 10 μm. In certain embodiments, the Dv50 is less than 1 mm, for example less than 100 μm, for example less than 50 μm, for example less than 30 μm, for example less than 20 μm, for example less than 10 μm, for example less than 8 μm, for example less than 5 μm, for example less than 3 μm, for example less than 1 μm. In certain embodiments, the Dv100 is less than 1 mm, for example less than 100 μm, for example less than 50 μm, for example less than 30 μm, for example less than 20 μm, for example less than 10 μm, for example less than 8 μm, for example less than 5 μm, for example less than 3 μm, for example less than 1 μm. In certain embodiments, the Dv99 is less than 1 mm, for example less than 100 μm, for example less than 50 μm, for example less than 30 μm, for example less than 20 μm, for example less than 10 μm, for example less than 8 μm, for example less than 5 μm, for example less than 3 μm, for example less than 1 μm. In certain embodiments, the Dv90 is less than 1 mm, for example less than 100 μm, for example less than 50 μm, for example less than 30 μm, for example less than 20 μm, for example less than 10 μm, for example less than 8 μm, for example less than 5 μm, for example less than 3 μm, for example less than 1 μm. In certain embodiments, the Dv0 is greater than 10 nm, for example greater than 100 nm, for example greater than 500 nm, for example greater than 1 μm, for example greater than 2 μm, for example greater than 5 μm, for example greater than 10 μm. In certain embodiments, the Dv1 is greater than 10 nm, for example greater than 100 nm, for example greater than 500 nm, for example greater than 1 μm, for example greater than 2 μm, for example greater than 5 μm, for example greater than 10 μm. In certain embodiments, the Dv10 is greater than 10 nm, for example greater than 100 nm, for example greater than 500 nm, for example greater than 1 μm, for example greater than 2 μm, for example greater than 5 μm, for example greater than 10 μm.

In some embodiments, the surface area of the porous carbon scaffold can comprise a surface area greater than 400 m2/g, for example greater than 500 m2/g, for example greater than 750 m2/g, for example greater than 1000 m2/g, for example greater than 1250 m2/g, for example greater than 1500 m2/g, for example greater than 1750 m2/g, for example greater than 2000 m2/g, for example greater than 2500 m2/g, for example greater than 3000 m2/g. In other embodiments, the surface area of the porous carbon scaffold can be less than 500 m2/g. In some embodiments, the surface area of the porous carbon scaffold is between 200 and 500 m2/g. In some embodiments, the surface area of the porous carbon scaffold is between 100 and 200 m2/g. In some embodiments, the surface area of the porous carbon scaffold is between 50 and 100 m2/g. In some embodiments, the surface area of the porous carbon scaffold is between 10 and 50 m2/g. In some embodiments, the surface area of the porous carbon scaffold can be less than 10 m2/g.

In some embodiments, the pore volume of the porous carbon scaffold is greater than 0.4 cm3/g, for example greater than 0.5 cm3/g, for example greater than 0.6 cm3/g, for example greater than 0.7 cm3/g, for example greater than 0.8 cm3/g, for example greater than 0.9 cm3/g, for example greater than 1.0 cm3/g, for example greater than 1.1 cm3/g, for example greater than 1.2 cm3/g, for example greater than 1.4 cm3/g, for example greater than 1.6 cm3/g, for example greater than 1.8 cm3/g, for example greater than 2.0 cm3/g. In other embodiments, the pore volume of the porous silicon scaffold is less than 0.5 cm3, for example between 0.1 cm3/g and 0.5 cm3/g. In certain other embodiments, the pore volume of the porous silicon scaffold is between 0.01 cm3/g and 0.1 cm3/g.

In some other embodiments, the porous carbon scaffold is an amorphous activated carbon with a pore volume between 0.2 and 2.0 cm3/g. In certain embodiments, the carbon is an amorphous activated carbon with a pore volume between 0.4 and 1.5 cm3/g. In certain embodiments, the carbon is an amorphous activated carbon with a pore volume between 0.5 and 1.2 cm3/g. In certain embodiments, the carbon is an amorphous activated carbon with a pore volume between 0.6 and 1.0 cm3/g.

In some other embodiments, the porous carbon scaffold comprises a tap density of less than 1.0 g/cm3, for example less than 0.8 g/cm3, for example less than 0.6 g/cm3, for example less than 0.5 g/cm3, for example less than 0.4 g/cm3, for example less than 0.3 g/cm3, for example less than 0.2 g/cm3, for example less than 0.1 g/cm3.

The surface functionality of the porous carbon scaffold can vary. One property which can be predictive of surface functionality is the pH of the porous carbon scaffold. The presently disclosed porous carbon scaffolds comprise pH values ranging from less than 1 to about 14, for example less than 5, from 5 to 8 or greater than 8. In some embodiments, the pH of the porous carbon is less than 4, less than 3, less than 2 or even less than 1. In other embodiments, the pH of the porous carbon is between about 5 and 6, between about 6 and 7, between about 7 and 8 or between 8 and 9 or between 9 and 10. In still other embodiments, the pH is high and the pH of the porous carbon ranges is greater than 8, greater than 9, greater than 10, greater than 11, greater than 12, or even greater than 13.

The pore volume distribution of the porous carbon scaffold can vary. For example, the % micropores can comprise less than 30%, for example less than 20%, for example less than 10%, for example less than 5%, for example less than 4%, for example less than 3%, for example less than 2%, for example less than 1%, for example less than 0.5%, for example less than 0.2%, for example, less than 0.1%. In certain embodiments, there is no detectable micropore volume in the porous carbon scaffold.

The mesopores comprising the porous carbon scaffold scaffold can vary. For example, the % mesopores can comprise less than 30%, for example less than 20%, for example less than 10%, for example less than 5%, for example less than 4%, for example less than 3%, for example less than 2%, for example less than 1%, for example less than 0.5%, for example less than 0.2%, for example, less than 0.1%. In certain embodiments, there is no detectable mesopore volume in the porous carbon scaffold.

In some embodiments, the pore volume distribution of the porous carbon scaffold scaffold comprises more than 50% macropores, for example more than 60% macropores, for example more than 70% macropores, for example more than 80% macropores, for example more than 90% macropores, for example more than 95% macropores, for example more than 98% macropores, for example more than 99% macropores, for example more than 99.5% macropores, for example more than 99.9% macropores.

In certain preferred embodiments, the pore volume of the porous carbon scaffold comprises a blend of micropores, mesopores, and macropores. Accordingly, in certain embodiments, the porous carbon scaffold comprises 0-20% micropores, 30-70% mesopores, and less than 10% macropores. In certain other embodiments, the porous carbon scaffold comprises 0-20% micropores, 0-20% mesopores, and 70-95% macropores. In certain other embodiments, the porous carbon scaffold comprises 20-50% micropores, 50-80% mesopores, and 0-10% macropores. In certain other embodiments, the porous carbon scaffold comprises 40-60% micropores, 40-60% mesopores, and 0-10% macropores. In certain other embodiments, the porous carbon scaffold comprises 80-95% micropores, 0-10% mesopores, and 0-10% macropores. In certain other embodiments, the porous carbon scaffold comprises 0-10% micropores, 30-50% mesopores, and 50-70% macropores. In certain other embodiments, the porous carbon scaffold comprises 0-10% micropores, 70-80% mesopores, and 0-20% macropores. In certain other embodiments, the porous carbon scaffold comprises 0-20% micropores, 70-95% mesopores, and 0-10% macropores. In certain other embodiments, the porous carbon scaffold comprises 0-10% micropores, 70-95% mesopores, and 0-20% macropores.

In certain embodiments, the % of pore volume in the porous carbon scaffold representing pores between 100 and 1000 A (10 and 100 nm) comprises greater than 30% of the total pore volume, for example greater than 40% of the total pore volume, for example greater than 50% of the total pore volume, for example greater than 60% of the total pore volume, for example greater than 70% of the total pore volume, for example greater than 80% of the total pore volume, for example greater than 90% of the total pore volume, for example greater than 95% of the total pore volume, for example greater than 98% of the total pore volume, for example greater than 99% of the total pore volume, for example greater than 99.5% of the total pore volume, for example greater than 99.9% of the total pore volume.

In certain embodiments, the pycnometry density of the porous carbon scaffold ranges from about 1 g/cc to about 3 g/cc, for example from about 1.5 g/cc to about 2.3 g/cc. In other embodiments, the skeletal density ranges from about 1.5 cc/g to about 1.6 cc/g, from about 1.6 cc/g to about 1.7 cc/g, from about 1.7 cc/g to about 1.8 cc/g, from about 1.8 cc/g to about 1.9 cc/g, from about 1.9 cc/g to about 2.0 cc/g, from about 2.0 cc/g to about 2.1 cc/g, from about 2.1 cc/g to about 2.2 cc/g or from about 2.2 cc/g to about 2.3 cc/g, from about 2.3 cc to about 2.4 cc/g, for example from about 2.4 cc/g to about 2.5 cc/g.

C. Silicon Production Via Chemical Vapor Infiltration (CVI)

Chemical vapor deposition (CVD) is a process wherein a substrate provides a solid surface comprising the first component of the composite, and the gas thermally decomposes on this solid surface to provide the second component of composite. Such a CVD approach can be employed, for instance, to create Si—C composite materials wherein the silicon is coating on the outside surface of silicon particles. Alternatively, chemical vapor infiltration (CVI) is a process wherein a substrate provides a porous scaffold comprising the first component of the composite, and the gas thermally decomposes on into the porousity (into the pores) of the porous scaffold material to provide the second component of composite.

In an embodiment, silicon is created within the pores of the porous carbon scaffold by subjecting the porous carbon particles to a silicon containing precursor gas at elevated temperature and the presence of a silicon-containing gas, preferably silane, in order to decompose said gas into silicon. The silicon containing precursor gas can be mixed with other inert gases, for example, nitrogen gas. The temperature and time of processing can be varied, for example the temperature can be between 200 and 900 C, for example between 200 and 250 C, for example between 250 and 300 C, for example between 300 and 350 C, for example between 300 and 400 C, for example between 350 and 450 C, for example between 350 and 400 C, for example between 400 and 500 C, for example between 500 and 600 C, for example between 600 and 700 C, for example between 700 and 800 C, for example between 800 and 900 C, for example between 600 and 1100 C.

The mixture of gas can comprise between 0.1 and 1% silane and remainder inert gas. Alternatively, the mixture of gas can comprise between 1% and 10% silane and remainder inert gas. Alternatively, the mixture of gas can comprise between 10% and 20% silane and remainder inert gas. Alternatively, the mixture of gas can comprise between 20% and 50% silane and remainder inert gas. Alternatively, the mixture of gas can comprise above 50% silane and remainder inert gas. Alternatively, the gas can essentially be 100% silane gas. Suitable inert gases include, but are not limited to, hydrogen, nitrogen, argon, and combinations thereof.

The pressure for the CVI process can be varied. In some embodiments, the pressure is atmospheric pressure. In some embodiments, the pressure is below atmospheric pressure. In some embodiments, the pressure is above atmospheric pressure.

C. Physico- and Electrochemical Properties of Silicon-Carbon Composite

While not wishing to be bound by theory, it is believed that the nano sized silicon achieved as a result of filling in certain, desired pore volume structure of the porous carbon scaffold (for instance, silicon filling pores in the range of 5 to 1000 nm, or other range as disclosed elsewhere herein), along with the advantageous properties of the other components of the composite, including low surface area, low pycnometry density, yield composite materials having different and advantageous properties, for instance electrochemical performance when the composite comprises an anode of a lithium ion energy storage device.

In certain embodiments, the embedded silicon particles embedded within the composite comprise nano-sized features. The nano-sized features can have a characteristic length scale of preferably less than 1 μm, preferably less than 300 nm, preferably less than 150 nm, preferably less than 100 μm, preferably less than 50 nm, preferably less than 30 nm, preferably less than 15 nm, preferably less than 10 nm, preferably less than 5 nm.

In certain embodiments, the silicon embedded within the composite is spherical in shape. In certain other embodiments, the porous silicon particles are non-spherical, for example rod-like, or fibrous in structure. In some embodiments, the silicon exists as a layer coating the inside of pores within the porous carbon scaffold. The depth of this silicon layer can vary, for example the depth can between 5 nm and 10 nm, for example between 5 nm and 20 nm, for example between 5 nm and 30 nm, for example between 5 nm and 33 nm, for example between 10 nm and 30 nm, for example between 10 nm and 50 nm, for example between 10 nm and 100 nm, for example between 10 and 150 nm, for example between 50 nm and 150 nm, for example between 100 and 300 nm, for example between 300 and 1000 nm.

In some embodiments, the silicon embedded within the composite is nano sized, and resides within pores of the porous carbon scaffold. For example, the embedded silicon can be impregnated, deposited by CVI, or other appropriate process into pores within the porous carbon particle comprising pore sizes between 5 and 1000 nm, for example between 10 and 500 nm, for example between 10 and 200 nm, for example between 10 and 100 nm, for example between 33 and 150 nm, for example between and 20 and 100 nm. Other ranges of carbon pores sizes with regards to fractional pore volume, whether micropores, mesopores, or macropores, are also envisioned.

Embodiments of the composite with extremely durable intercalation of lithium disclosed herein improves the properties of any number of electrical energy storage devices, for example lithium ion batteries. In some embodiments, the silicon-carbon composite disclosed herein exhibits a Z less than 5, for example a Z less than 4, for example a Z less than 3, for example a Z less than 2, for example a Z less than 1, for example a Z less than 0.1, for example a Z less than 0.01, for example a Z less than 0.001. In certain embodiments, the Z is essentially zero. In certain embodiments, the Z has a negative value, i.e., M800>M1100.

In certain preferred embodiment, the silicon-carbon composite comprises desireably low Z in combination with another desired physicochemical and/or electrochemical property or in combination with more than one other desired physicochemical and/or electrochemical properties. Table 1 provides a description of certain embodiments for combination of properties for the silicon-carbon composite.

TABLE 1

| Embodiments for silicon-carbon composite with embodied properties. | |
|---|---|
| | In some embodiments the silicon-carbon composite comprises . . . |
| Z | <5, <4, <3, <2, <1, <0.1, <0.01, <0.01, 0, negative value; |
| Surface Area | <100 m2/g, <50 m2/g, <30 m2/g, <20 m2/g, <10 m2/g, <5 m2/g, <4 m2/g, <3 m2/g, <2 m2/g, <1 m2/g; |
| First Cycle Efficiency | >75%, >80%, >85%, >90%, >91%, >92%, >93%, >94%, >95%, >96%, >97%, >98%, >99%; |
| Reversible Capacity | >1300 mAh/g, >1600 mAh/g, >1700 mAh/g, >1800 mAh/g, >1900 mAh/g, >2000 mAh/g, >2100 mAh/g, >2200 mAh/g, >2300 mAh/g, >2400 mAh/g, >2500 mAh/g, >2600 mAh/g, >2700 mAh/g, >2800 mAh/g, >2900 mAh/g, >3000 mAh/g; and/or |
| Silicon Content by weight | 10%-90%, 15-85%, 20%-80%, 30%-70%, 40%-60%. |

According to Table 1, the silicon-carbon composite may comprise combinations of various properties. For example, the silicon-carbon composite may comprise a Z less than 4, surface area less than 100 m2/g, a first cycle efficiency greater than 80%, and a reversible capacity of at least 1300 mAh/g. For example, the silicon-carbon composite may comprise a Z less than 4, surface area less than 100 m2/g, a first cycle efficiency greater than 80%, and a reversible capacity of at least 1600 mAh/g. For example, the silicon-carbon composite may comprise a Z less than 4, surface area less than 20 m2/g, a first cycle efficiency greater than 85%, and a reversible capacity of at least 1600 mAh/g. For example, the silicon-carbon composite may comprise a Z less than 4, surface area less than 10 m2/g, a first cycle efficiency greater than 85%, and a reversible capacity of at least 1600 mAh/g. For example, the silicon-carbon composite may comprise a Z less than 4, surface area less than 10 m2/g, a first cycle efficiency greater than 90%, and a reversible capacity of at least 1600 mAh/g. For example, the silicon-carbon composite may comprise a Z less than 4, surface area less than 10 m2/g, a first cycle efficiency greater than 90%, and a reversible capacity of at least 1800 mAh/g.

The silicon-carbon composite can comprise a combination of the aforementioned properties, in addition to also comprising a carbon scaffold comprising properties also described within this proposal. Accordingly, Table 2 provides a description of certain embodiments for combination of properties for the silicon-carbon composite.

TABLE 2

| Embodiments for silicon-carbon composite with embodied properties. | |
|---|---|
| | In some embodiments the silicon-carbon composite comprises . . . |
| Z | <5, <4, <3, <2, <1, <0.1, <0.01, <0.01, 0, negative value; |
| Surface Area | <100 m2/g, <50 m2/g, <30 m2/g, <20 m2/g, <10 m2/g, <5 m2/g, <4 m2/g, <3 m2/g, <2 m2/g, <1 m2/g; |
| First Cycle Efficiency | >75%, >80%, >85%, >90%, >91%, >92%, >93%, >94%, >95%, >96%, >97%, >98%, >99%; |
| Reversible Capacity | >1300 mAh/g, >1600 mAh/g, >1700 mAh/g, >1800 mAh/g, >1900 mAh/g, >2000 mAh/g, >2100 mAh/g, >2200 mAh/g, >2300 mAh/g, >2400 mAh/g, >2500 mAh/g, >2600 mAh/g, >2700 mAh/g, >2800 mAh/g, >2900 mAh/g, >3000 mAh/g; |
| Silicon Content by weight | 10%-90%, 15-85%, 20%-80%, 30%-70%, 40%-60%; |
| Carbon Scaffold pore volume | 0.1-1.5 cm3/g, 0.2-1.2 cm3/g, 0.3-1.1 cm3/g, 0.4-1.0 cm3/g, 0.4-1.0 cm3/g, 0.5-1.0 cm3/g, 0.6-1.0 cm3/g, 0.5-0.9 cm3/g, 0.4-1.0 cm3/g, >0.1 cm3/g, >0.2 cm3/g, >0.4 cm3/g, >0.6 cm3/g, >0.8 cm3/g; |
| % silicon content | 15%-25%, 25%-35%, 20%-40%, 25%-50%, 30%-70%, 30%-60%, 60%-80%, 80%-100%; |
| Scaffold pore size range | <1 nm, 1-5 nm, 5-1000 nm, 10-500 nm, 10-200 nm, 10-100 nm, 33-150 nm, 20-100 nm; and/or |
| Percentage of micro-porosity/ meso-porosity/ macro-porosity expressed as percentage of total pore volume | >20%/>30%/>30%, <10/>30/>30, <5/>30/>30, <5/>40/>40, <1/>40/>40, <10/>70/>20, <10/>20/>70, >10/>10/>80, <10/>80/>10, <5/>70/>20, <5/>20/>70,<5/>5/>80, <5/>80/>10, >80%/<20%/<20%, >70/<30/<10, >70/<30/<5, >70/<20/<10, >70/<10/<10, >70/<10/<5, >70/<5/<5, >80/<20/<10, >80/<20/<5, >80/<20/<1, >80/<10/<10, >80/<10/<5, >80/<10/<1, >90/<10/<10, >90/<10/<5, >90/<10/<1, >90/<5/<1, >95/<5/<5, >90/<5/<1 |

As used in herein, the percentage "microporosity," "mesoporosity" and "macroporosity" refers to the percent of micropores, mesopores and macropores, respectively, as a percent of total pore volume. For example, a carbon scaffold having 90% microporosity is a carbon scaffold where 90% of the total pore volume of the carbon scaffold is formed by micropores.

According to Table 2, the silicon-carbon composite may comprise combinations of various properties. For example, the silicon-carbon composite may comprise a Z less than 4, surface area less than 100 m2/g, a first cycle efficiency greater than 80%, a reversible capacity of at least 1600 mAh/g, a silicon content of 15%-85%, a carbon scaffold totoal pore volume of 0.2-1.2 cm3/g wherein the scaffold pore volume comprises >80% micropores, <20% mesopores, and <10% macropores. For example, the silicon-carbon composite may comprise a Z less than 4, surface area less than 20 m2/g, a first cycle efficiency greater than 85%, and a reversible capacity of at least 1600 mAh/g, a silicon content of 15%-85%, a carbon scaffold totoal pore volume of 0.2-1.2 cm3/g wherein the scaffold pore volume comprises >80% micropores, <20% mesopores, and <10% macropores. For example, the silicon-carbon composite may comprise a Z less than 4, surface area less than 10 m2/g, a first cycle efficiency greater than 85%, and a reversible capacity of at least 1600 mAh/g, a silicon content of 15%-85%, a carbon scaffold totoal pore volume of 0.2-1.2 cm3/g wherein the scaffold pore volume comprises >80% micropores, <20% mesopores, and <10% macropores. For example, the silicon-carbon composite may comprise a Z less than 4, surface area less than 10 m2/g, a first cycle efficiency greater than 90%, and a reversible capacity of at least 1600 mAh/g, a silicon content of 15%-85%, a carbon scaffold totoal pore volume of 0.2-1.2 cm3/g wherein the scaffold pore volume comprises >80% micropores, <20% mesopores, and <10% macropores. For example, the silicon-carbon composite may comprise a Z less than 4, surface area less than 10 m2/g, a first cycle efficiency greater than 90%, and a reversible capacity of at least 1800 mAh/g, a silicon content of 15%-85%, a carbon scaffold totoal pore volume of 0.2-1.2 cm3/g wherein the scaffold pore volume comprises >80% micropores, <20% mesopores, and <10% macropores.

Without being bound by theory, the filling of silicon within the pores of the porous carbon traps porosity within the porous carbon scaffold particle, resulting in inaccessible volume, for example volume that is inaccessible to nitrogen gas.

Accordingly, the silcon-carbon composite material may exhibit a pycnometry density of less than 2.1 g/cm3, for example less than 2.0 g/cm3, for example less than 1.9 g/cm3, for example less than 1.8 g/cm3, for example less than 1.7 g/cm3, for example less than 1.6 g/cm3, for example less than 1.4 g/cm3, for example less than 1.2 g/cm3, for example less than 1.0 g/cm3.

The pore volume of the composite material exhibiting extremely durable intercalation of lithium can range between 0.01 cm3/g and 0.2 cm3/g. In certain embodiments, the pore volume of the composite material can range between 0.01 cm3/g and 0.15 cm3/g, for example between 0.01 cm3/g and 0.1 cm3/g, for example between 0.01 cm3/g and 0.05 cm2/g.

The particle size distribution of the composite material exhibiting extremely durable intercalation of lithium is important to both determine power performance as well as volumetric capacity. As the packing improves, the volumetric capacity may increase. In one embodiment the distributions are either Gaussian with a single peak in shape, bimodal, or polymodal (>2 distinct peaks, for example trimodal). The properties of particle size of the composite can be described by the DO (smallest particle in the distribution), Dv50 (average particle size) and Dv100 (maximum size of the largest particle). The optimal combined of particle packing and performance will be some combination of the size ranges below. The particle size reduction in the such embodiments can be carried out as known in the art, for example by jet milling in the presence of various gases including air, nitrogen, argon, helium, supercritical steam, and other gases known in the art.

In one embodiment the Dv0 of the composite material can range from 1 nm to 5 microns. In another embodiment the Dv0 of the composite ranges from 5 nm to 1 micron, for example 5-500 nm, for example 5-100 nm, for example 10-50 nm. In another embodiment the Dv0 of the composite ranges from 500 nm to 2 microns, or 750 nm to 1 μm, or 1-2 μm. microns to 2 microns. In other embodiments, the Dv0 of the composite ranges from 2-5 μm, or >5 μm.

In some embodiments the Dv50 of the composite material ranges from 5 nm to 20 μm. In other embodiments the Dv50 of the composite ranges from 5 nm to 1 μm, for example 5-500 nm, for example 5-100 nm, for example 10-50 nm. In another embodiment the Dv50 of the composite ranges from 500 nm to 2 μm, 750 nm to 1 μm, 1-2 μm. In still another embodiments, the Dv50 of the composite ranges from 1 to 1000 μm, for example from 1-100 μm, for example from 1-10 μm, for example 2-20 μm, for example 3-15 μm, for example 4-8 μm. In certain embodiments, the Dv50 is >20 μm, for example >50 μm, for example >100 μm.

The span (Dv90-Dv10)/(Dv50), wherein Dv10, Dv50 and Dv90 represent the particle size at 10%, 50%, and 90% of the volume distribution, can be varied from example from 100 to 10, from 10 to 5, from 5 to 2, from 2 to 1; in some embodiments the span can be less than 1. In certain embodiments, the composite comprising carbon and porous silicon material particle size distribution can be multimodal, for example, bimodal, or trimodal.

The surface functionality of the presently disclosed the composite material exhibiting extremely durable intercalation of lithium may be altered to obtain the desired electrochemical properties. One property which can be predictive of surface functionality is the pH of the composite materials. The presently disclosed composite materials comprise pH values ranging from less than 1 to about 14, for example less than 5, from 5 to 8 or greater than 8. In some embodiments, the pH of the composite materials is less than 4, less than 3, less than 2 or even less than 1. In other embodiments, the pH of the composite materials is between about 5 and 6, between about 6 and 7, between about 7 and 8 or between 8 and 9 or between 9 and 10. In still other embodiments, the pH is high and the pH of the composite materials ranges is greater than 8, greater than 9, greater than 10, greater than 11, greater than 12, or even greater than 13.

The silicon-carbon composite material may comprise varying amounts of carbon, oxygen, hydrogen and nitrogen as measured by gas chromatography CHNO analysis. In one embodiment, the carbon content of the composite is greater than 98 wt. % or even greater than 99.9 wt % as measured by CHNO analysis. In another embodiment, the carbon content of the silicon-carbon composite ranges from about 10-90%, for example 20-80%, for example 30-70%, for example 40-60%.

In some embodiments, silicon-carbon composite material comprises a nitrogen content ranging from 0-90%, example 0.1-1%, for example 1-3%, for example 1-5%, for example 1-10%, for example 10-20%, for example 20-30%, for example 30-90%.

In some embodiments, the oxygen content ranges from 0-90%, example 0.1-1%, for example 1-3%, for example 1-5%, for example 1-10%, for example 10-20%, for example 20-30%, for example 30-90%.

The silicon-carbon composite material may also incorporate an electrochemical modifier selected to optimize the electrochemical performance of the non-modified composite. The electrochemical modifier may be incorporated within the pore structure and/or on the surface of the porous carbon scaffold, within the embedded silicon, or within the final layer of carbon, or conductive polymer, coating, or incorporated in any number of other ways. For example, in some embodiments, the composite materials comprise a coating of the electrochemical modifier (e.g., silicon or $Al_2O_3$) on the surface of the carbon materials. In some embodiments, the composite materials comprise greater than about 100 ppm of an electrochemical modifier. In certain embodiments, the electrochemical modifier is selected from iron, tin, silicon, nickel, aluminum and manganese.

In certain embodiments the electrochemical modifier comprises an element with the ability to lithiate from 3 to 0 V versus lithium metal (e.g. silicon, tin, sulfur). In other embodiments, the electrochemical modifier comprises metal oxides with the ability to lithiate from 3 to 0 V versus lithium metal (e.g. iron oxide, molybdenum oxide, titanium oxide). In still other embodiments, the electrochemical modifier comprises elements which do not lithiate from 3 to 0 V versus lithium metal (e.g. aluminum, manganese, nickel, metal-phosphates). In yet other embodiments, the electrochemical modifier comprises a non-metal element (e.g. fluorine, nitrogen, hydrogen). In still other embodiments, the electrochemical modifier comprises any of the foregoing electrochemical modifiers or any combination thereof (e.g. tin-silicon, nickel-titanium oxide).

The electrochemical modifier may be provided in any number of forms. For example, in some embodiments the electrochemical modifier comprises a salt. In other embodiments, the electrochemical modifier comprises one or more elements in elemental form, for example elemental iron, tin, silicon, nickel or manganese. In other embodiments, the electrochemical modifier comprises one or more elements in oxidized form, for example iron oxides, tin oxides, silicon oxides, nickel oxides, aluminum oxides or manganese oxides.

The electrochemical properties of the composite material can be modified, at least in part, by the amount of the electrochemical modifier in the material, wherein the electrochemical modifier is an alloying material such as silicon, tin, indium, aluminum, germanium, gallium. Accordingly, in some embodiments, the composite material comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier.

The particle size of the composite material may expand upon lithiation as compared to the non-lithiated state. For example, the expansion factor, defined as ratio of the average particle size of particles of composite material comprising a porous silicon material upon lithiation divided by the average particle size under non-lithiated conditions. As described in the art, this expansion factor can be relatively large for previously known, non-optimal silicon-containing materials, for example about 4× (corresponding to a 400% volume expansion upon lithiation). The current inventors have discovered composite materials comprising a porous silicon material that can exhibit a lower extent of expansion, for example, the expansion factor can vary from 3.5 to 4, from 3.0 to 3.5, from 2.5 to 3.0, from 2.0 to 2.5, from 1.5 to 2.0, from 1.0 to 1.5.

It is envisioned that composite materials in certain embodiments will comprise a fraction of trapped pore volume, namely, void volume non-accessible to nitrogen gas as probed by nitrogen gas sorption measurement. Without being bound by theory, this trapped pore volume is important in that it provides volume into which silicon can expand upon lithiation.

In certain embodiments, the ratio of trapped void volume to the silicon volume comprising the composite particle is between 0.1:1 and 10:1. For example, the ratio of trapped void volume to the silicon volume comprising the composite particle is between 1:1 and 5:1, or 5:1 to 10:1. In embodiments, the ratio of ratio trapped void volume to the silicon volume comprising the composite particle is between 2:1 and 5:1, or about 3:1, in order to efficiently accommodate the maximum extent of expansion of silicon upon lithiation.

In certain embodiments, the electrochemical performance of the composite disclosed herein is tested in a half-cell; alternatively the performance of the composite with extremely durable intercalation of lithium disclosed herein is tested in a full cell, for example a full cell coin cell, a full cell pouch cell, a prismatic cell, or other battery configurations known in the art. The anode composition comprising the composite with extremely durable intercalation of lithium disclosed herein can further comprise various species, as known in the art. Additional formulation components include, but are not limited to, conductive additives, such as conductive carbons such as Super C45, Super P, Ketjenblack carbons, and the like, conductive polymers and the like, binders such as styrene-butadiene rubber sodium carboxymethylcellulose (SBR—Na-CMC), polyvinylidene difluoride (PVDF), polyimide (PI), polyacrylic acid (PAA) and the like, and combinations thereof. In certain embodiments, the binder can comprise a lithium ion as counter ion.

Other species comprising the electrode are known in the art. The % of active material in the electrode by weight can vary, for example between 1 and 5%, for example between 5 and 15%, for example between 15 and 25%, for example between 25 and 35%, for example between 35 and 45%, for example between 45 and 55%, for example between 55 and 65%, for example between 65 and 75%, for example between 75 and 85%, for example between 85 and 95%. In some embodiments, the active material comprises between 80 and 95% of the electrode. In certain embodiment, the amount of conductive additive in the electrode can vary, for example between 1 and 5%, between 5 and 15%, for example between 15 and 25%, for example between 25 and 35%. In some embodiments, the amount of conductive additive in the electrode is between 5 and 25%. In certain embodiments, the amount of binder can vary, for example between 1 and 5%, between 5 and 15%, for example between 15 and 25%, for example between 25 and 35%. In certain embodiments, the amount of conductive additive in the electrode is between 5 and 25%.

The silicon-carbon composite material may be prelithiated, as known in the art. In certain embodiments, the prelithiation is achieved electrochemically, for example in a half cell, prior to assembling the lithiated anode comprising the porous silicon material into a full cell lithium ion battery. In certain embodiments, prelithiation is accomplished by doping the cathode with a lithium-containing compound, for example a lithium containing salt. Examples of suitable lithium salts in this context include, but are not limited to, dilithium tetrabromonickelate (II), dilithium tetrachlorocuprate (II), lithium azide, lithium benzoate, lithium bromide, lithium carbonate, lithium chloride, lithium cyclohexanebutyrate, lithium fluoride, lithium formate, lithium hexafluoroarsenate (V), lithium hexafluorophosphate, lithium hydroxide, lithium iodate, lithium iodide, lithium metaborate, lithium perchlorate, lithium phosphate, lithium sulfate, lithium tetraborate, lithium tetrachloroaluminate, lithium tetrafluoroborate, lithium thiocyanate, lithium trifluoromethanesulfonate, lithium trifluoromethanesulfonate, and combinations thereof.

The anode comprising the silicon-carbon composite material can be paired with various cathode materials to result in a full cell lithium ion battery. Examples of suitable cathode materials are known in the art. Examples of such cathode materials include, but are not limited to $LiCoO_2$ (LCO), $LiNi_{0.8}Co_{0.15}Al_{0.05}O_2$ (NCA), $LiNi_{1/3}Co_{1/3}Mn_{1/3}O_2$ (NMC), $LiMn_2O_4$ and variants (LMO), and $LiFePO_4$ (LFP).

For the full cell lithium ion battery comprising an anode further comprising the silicon-carbon composite material, pairing of cathode to anode can be varied. For example, the ratio of cathode-to-anode capacity can vary from 0.7 to 1.3. In certain embodiments, the ratio of cathode-to-anode capacity can vary from 0.7 to 1.0, for example from 0.8 to 1.0, for example from 0.85 to 1.0, for example from 0.9 to 1.0, for example from 0.95 to 1.0. In other embodiments, the ratio of cathode-to-anode capacity can vary from 1.0 to 1.3, for example from 1.0 to 1.2, for example from 1.0 to 1.15, for example from 1.0 to 1.1, for example from 1.0 to 1.05. In yet other embodiments, the ratio of cathode-to-anode capacity can vary from 0.8 to 1.2, for example from 0.9 to 1.1, for example from 0.95 to 1.05.

For the full cell lithium ion battery comprising an anode further comprising the silicon-carbon composite material, the voltage window for charging and discharging can be varied. In this regard, the voltage window can be varied as known in the art, depending on various properties of the lithium ion battery. For instance, the choice of cathode plays a role in the voltage window chosen, as known in the art. Examples of voltage windows vary, for example, in terms of potential versus Li/Li+, from 2.0 V to 5.0 V, for example from 2.5 V to 4.5V, for example from 2.5V to 4.2V.

For the full cell lithium ion battery comprising an anode further comprising the silicon-carbon composite material, the strategy for conditioning the cell can be varied as known in the art. For example, the conditioning can be accomplished by one or more charge and discharge cycles at various rate(s), for example at rates slower than the desired cycling rate. As known in the art, the conditioning process may also include a step to unseal the lithium ion battery, evacuate any gases generated within during the conditioning process, followed by resealing the lithium ion battery.

For the full cell lithium ion battery comprising an anode further comprising the silicon-carbon composite material, the cycling rate can be varied as known in the art, for example, the rate can between C/20 and 20C, for example between C10 to 10C, for example between C/5 and 5C. In certain embodiments, the cycling rate is C/10. In certain embodiments, the cycling rate is C/5. In certain embodiments, the cycling rate is C/2. In certain embodiments, the cycling rate is 1C. In certain embodiments, the cycling rate is 1C, with periodic reductions in the rate to a slower rate, for example cycling at 1C with a C/10 rate employed every 20th cycle. In certain embodiments, the cycling rate is 2C. In certain embodiments, the cycling rate is 4C. In certain embodiments, the cycling rate is 5C. In certain embodiments, the cycling rate is 10C. In certain embodiments, the cycling rate is 20C.

The first cycle efficiency of the composite with extremely durable intercalation of lithium disclosed herein be determined by comparing the lithium inserted into the anode during the first cycle to the lithium extracted from the anode on the first cycle, prior prelithiation modification. When the insertion and extraction are equal, the efficiency is 100%. As known in the art, the anode material can be tested in a half-cell, where the counter electrode is lithium metal, the electrolyte is a 1M $LiPF_6$ 1:1 ethylene carbonate:diethylcarbonate (EC:DEC), using a commercial polypropylene separator. In certain embodiments, the electrolyte can comprise various additives known to provide improved performance, such as fluoroethylene carbonate (FEC) or other related fluorinated carbonate compounds, or ester co-solvents such as methyl butyrate, vinylene carbonate, and other electrolyte additives known to improve electrochemical performance of silicon-comprising anode materials.

Coulombic efficiency can be averaged, for example averaged over cycles 7 to cycle 25 when tested in a half cell. Coulombic efficiency can be averaged, for example averaged over cycles 7 to cycle 20 when tested in a half cell. In certain embodiments, the average efficiency of the composite with extremely durable intercalation of lithium is greater than 0.9, or 90%. In certain embodiments, the average efficiency is greater than 0.95, or 95%. In certain other embodiments, the averge efficiency is 0.99 or greater, for example 0.991 or greater, for example 0.992 or greater, for example 0.993 or greater, for example 0.994 or greater, for example 0.995 or greater, for example 0.996 or greater, for example 0.997 or greater, for example 0.998 or greater, for example 0.999 or greater, for example 0.9991 or greater, for example 0.9992 or greater, for example 0.9993 or greater, for example 0.9994 or greater, for example 0.9995 or greater, for example 0.9996 or greater, for example 0.9997 or greater, for example 0.9998 or greater, for example 0.9999 or greater.

In still other embodiments the present disclosure provides a composite material exhibiting extremely durable intercalation of lithium, wherein when the composite material is incorporated into an electrode of a lithium-based energy storage device the composite material has a volumetric capacity at least 10% greater than when the lithium based energy storage device comprises a graphite electrode. In some embodiments, the lithium based energy storage device is a lithium ion battery. In other embodiments, the composite material has a volumetric capacity in a lithium-based energy storage device that is at least 5% greater, at least 10% greater, at least 15% greater than the volumetric capacity of the same electrical energy storage device having a graphite electrode. In still other embodiments, the composite material has a volumetric capacity in a lithium based energy storage device that is at least 20% greater, at least 30% greater, at least 40% greater, at least 50% greater, at least 200% greater, at least 100% greater, at least 150% greater, or at least 200% greater than the volumetric capacity of the same electrical energy storage device having a graphite electrode.

The composite material may be prelithiated, as known in the art. These lithium atoms may or may not be able to be separated from the carbon. The number of lithium atoms to 6 carbon atoms can be calculated by techniques known to those familiar with the art:

$$\#Li=Q\times 3.6\times MM/(C\ \%\times F)$$

wherein Q is the lithium extraction capacity measured in mAh/g between the voltages of 5 mV and 2.0V versus lithium metal, MM is 72 or the molecular mass of 6 carbons, F is Faraday's constant of 96500, C % is the mass percent carbon present in the structure as measured by CHNO or XPS.

The composite material can be characterized by the ratio of lithium atoms to carbon atoms (Li:C) which may vary between about 0:6 and 2:6. In some embodiments the Li:C ratio is between about 0.05:6 and about 1.9:6. In other embodiments the maximum Li:C ratio wherein the lithium is in ionic and not metallic form is 2.2:6. In certain other embodiments, the Li:C ratio ranges from about 1.2:6 to about 2:6, from about 1.3:6 to about 1.9:6, from about 1.4:6 to about 1.9:6, from about 1.6:6 to about 1.8:6 or from about 1.7:6 to about 1.8:6. In other embodiments, the Li:C ratio is greater than 1:6, greater than 1.2:6, greater than 1.4:6, greater than 1.6:6 or even greater than 1.8:6. In even other embodiments, the Li:C ratio is about 1.4:6, about 1.5:6, about 1.6:6, about 1.6:6, about 1.7:6, about 1.8:6 or about 2:6. In a specific embodiment the Li:C ratio is about 1.78:6.

In certain other embodiments, the composite material comprises an Li:C ratio ranging from about 1:6 to about 2.5:6, from about 1.4:6 to about 2.2:6 or from about 1.4:6 to about 2:6. In still other embodiments, the composite materials may not necessarily include lithium, but instead have a lithium uptake capacity (i.e., the capability to uptake a certain quantity of lithium, for example upon cycling the material between two voltage conditions (in the case of a lithium ion half cell, an exemplary voltage window lies between 0 and 3 V, for example between 0.005 and 2.7 V, for example between 0.005 and 1 V, for example between 0.005 and 0.8 V). While not wishing to be bound by theory, it is believed the lithium uptake capacity of the composite materials contributes to their superior performance in lithium based energy storage devices. The lithium uptake capacity is expressed as a ratio of the atoms of lithium taken up by the composite. In certain other embodiments, the composite material exhibiting extremely durable intercalation of lithium comprise a lithium uptake capacity ranging from about 1:6 to about 2.5:6, from about 1.4:6 to about 2.2:6 or from about 1.4:6 to about 2:6.

In certain other embodiments, the lithium uptake capacity ranges from about 1.2:6 to about 2:6, from about 1.3:6 to about 1.9:6, from about 1.4:6 to about 1.9:6, from about 1.6:6 to about 1.8:6 or from about 1.7:6 to about 1.8:6. In other embodiments, the lithium uptake capacity is greater than 1:6, greater than 1.2:6, greater than 1.4:6, greater than 1.6:6 or even greater than 1.8:6. In even other embodiments, the Li:C ratio is about 1.4:6, about 1.5:6, about 1.6:6, about 1.6:6, about 1.7:6, about 1.8:6 or about 2:6. In a specific embodiment the Li:C ratio is about 1.78:6.

The various electrochemical states of silicon upon lithiation and delithiation can be characterization

EXAMPLES

Example 1. Production of silicon-carbon compsite material by CVI. The properties of the carbon scaffold (Carbon Scaffold 1) employed for producing the silicon-carbon compsite is presented in Table 3. Employing Carbon Scaffold 1, the silicon-carbon composite (Silicon-Carbon Composite 1) was produced by CVI as follows. A mass of 0.2 grams of amorphous porous carbon was placed into a 2 in.×2 in. ceramic crucible then positioned in the center of a horizontal tube furnace. The furnace was sealed and continuously purged with nitrogen gas at 500 cubic centimeters per minute (ccm). The furnace temperature was increased at 20° C./min to 450° C. peak temperature where it was allowed to equilibrate for 30 minutes. At this point, the nitrogen gas is shutoff and then silane and hydrogen gas are introduced at flow rates of 50 ccm and 450 ccm, respectively for a total dwell time of 30 minutes. After the dwell period, silane and hydrogen were shutoff and nitrogen was again introduced to the furnace to purge the internal atmosphere. Simultaneously the furnace heat is shutoff and allowed to cool to ambient temperature. The completed Si—C material is subsequently removed from the furnace.

TABLE 3

Description of carbon scaffold employed for Example 1.

| Carbon Scaffold # | Surface Area (m2/g) | Pore Volume (cm3/g) | % Micro-pores | % Meso-pores | % Macro-pores |
|---|---|---|---|---|---|
| 1 | 1710 | 0.762 | 93.1 | 6.8 | 0.1 |

Example 2. Analysis of various silicon-composite materials. A variety of carbon scaffold materials were employed to produce a variety of silicon-carbon composite materials employing the CVI methodology as generally described in Example 1. The carbon scaffold materials were characterized by nitrogen sorption gas analysis to determine specific surface area, total pore volume, and fraction of pore volume comprising micropores, mesopores, and macropores. The data are presented in Table 4.

TABLE 4

Properites of various carbon scaffold materials.

| Carbon Scaffold # | Surface Area (m2/g) | Pore Volume (cm3/g) | % Micro-pores | % Meso-pores | % Macro-pores |
|---|---|---|---|---|---|
| 1 | 1710 | 0.762 | 93.1 | 6.8 | 0.1 |
| 2 | 1697 | 0.77 | 91.9 | 8.0 | 0.1 |
| 3 | 1744 | 0.72 | 97.2 | 8.0 | 0.1 |
| 4 | 1581 | 0.832 | 69.1 | 30.9 | 0.1 |
| 5 | 1722 | 0.77 | 93.1 | 6.8 | 0.1 |
| 6 | 1710 | 0.817 | 80.1 | 19.9 | 0 |
| 7 | 1835 | 0.9 | 82.2 | 17.8 | 0 |
| 8 | 2807 | 1.296 | 85.1 | 14.9 | 0.1 |
| 9 | 1475 | 1.06 | 52.4 | 47.6 | 0 |
| 10 | 453 | 0.5 | 3.9 | 91.1 | 5.1 |
| 11 | 787 | 2.284 | 0 | 59.1 | 40.9 |
| 12 | 1746 | 0.7552 | 95 | 5 | 0 |

Employing these carbon scaffold materials, various silicon-carbon composite materials employing the CVI methodology as described herein. The surface area for the silicon-carbon compsoites was determined. The silicon-carbon composites were also analyzed by TGA to determine silicon content and the Z. For materials exhibiting a negative Z, the Z is described as zero. Silicon-carbon composite materials were also tested in half-cell coin cells. The anode for the half-cell coin cell can comprise 60-90% silicon-carbon composite, 5-20% Na-CMC (as binder) and 5-20% Super C45 (as conductivity enhancer), and the electrolyte can comprise 2:1 ethylene carbonate:diethylene carbonate, 1 M $LiPF_6$ and 10% fluoroethylene carbonate. The half-cell coin cells can be cycled at 25° C. at a rate of C/5 for 5 cycles and then cycled thereafter at C/10 rate. The voltage can be cycled between 0 V and 0.8 V, alternatively, the voltage can be cycled between 0 V and 1.5 V. From the half-cell coin cell data, the maimum capacity can be measured, as well as the average Coulombic efficiencty (CE) over the range of cycles from cycle 7 to cycle 20. Physicochemical and electrochemical properties for various silicon-carbon composite materials are presented in Table 5.

TABLE 5

Properites of various silicon-carbon carbon scaffold materials.

| Silicon-Carbon Composite # | Carbon Scaffold # | Surface Area (m2/g) | Si content (%) | Z | Max Capacity (mAh/g) | Average CE (7-20) |
|---|---|---|---|---|---|---|
| 1 | 1 | 7 | 45.0 | 0 | 1433 | 0.9981 |
| 2 | 1 | 7 | 45.4 | 0.4 | 1545 | 0.9980 |
| 3 | 1 | 6 | 45.8 | 0.4 | 1510 | 0.9975 |
| 4 | 2 | 33.7 | 45.8 | 0.43 | 1392 | 0.9993 |
| 5 | 3 | 3.06 | 50.1 | 1.0 | 1665 | 0.9969 |
| 6 | 2 | 95 | 42.0 | 1.79 | 1575 | 0.9970 |
| 7 | 3 | 1.96 | 51.3 | 2.0 | 1662 | 0.9974 |
| 8 | 2 | 4.5 | 46.4 | 2.29 | 1836 | 0.9987 |
| 9 | 4 | 140 | 43.1 | 2.40 | 832 | 0.9941 |
| 10 | 3 | 1.61 | 48.7 | 2.78 | 1574 | 0.9977 |
| 11 | 3 | 2 | 48.5 | 3.01 | 1543 | 0.9972 |
| 12 | 5 | 8 | 46.3 | 3.4 | 1373 | 0.9976 |
| 13 | 6 | 44 | 51.2 | 3.85 | 1614 | 0.9975 |
| 14 | 2 | 34 | 45.0 | 4.4 | 1399 | 0.9980 |
| 15 | 7 | 94 | 48.9 | 4.87 | 1455 | 0.9969 |
| 16 | 8 | 62.7 | 61.6 | 9 | 2056 | 0.9931 |
| 17 | 9 | 61 | 52.1 | 10.0 | 2011 | 0.9869 |
| 18 | 10 | 68.5 | 34.6 | 13.8 | 1006 | 0.9909 |
| 19 | 11 | 20 | 74 | 33.5 | 2463 | 0.9717 |
| 20 | 11 | 149 | 57.7 | 34.5 | 1892 | 0.9766 |
| 21 | 11 | 61.7 | 68.9 | 38.69 | 2213 | 0.9757 |
| 22 | 12 | 5 | 38 | 0.16 | 1037 | 0.9987 |

TABLE 5-continued

Properites of various silicon-carbon carbon scaffold materials.

| Silicon-Carbon Composite # | Carbon Scaffold # | Surface Area (m2/g) | Si content (%) | Z | Max Capacity (mAh/g) | Average CE (7-20) |
|---|---|---|---|---|---|---|
| 23 | 12 | 3 | 37 | 0.12 | 899 | 0.9984 |

A plot of the average Coulombic efficiency as a function of the Z is presented in FIG. 1. As can seen there was dramatic increase in the average Coulombic efficiency for silicon-carbon samples with low Z. In particular, all silicon-carbon samples with Z below 5.0 (Silicon-Carbon Composite Sample 1 through Silicon-Carbon Composite Sample 15, Silicon Composite 22, and Silicon Composite 23) exhibited average Coulombic efficiency ≥0.9941, and all silicon-carbon samples with Z above 5.0 (Silicon-Carbon Composite Sample 16 through Silicon-Carbon Composite Sample 21) were observed to have average Coulombic efficiency ≤0.9931. Without being bound by theory, higher Coulombic efficiency for the silicon-carbon samples with Z<5 provides for superior cycling stability in full cell lithium ion batteries. Further inspection of Table reveals the surprising and unexpected finding that the combination of silicon-carbon composite samples with Z<5 and also comprising carbon scaffold comprising >69.1 microporosity provides for average Coulombic efficiency ≥0.9969.

Therefore, in a preferered embodiment, the silicon-carbon composite material comprises a Z less than 5, for example less Z less than 4, for example less Z less than 3, for example less Z less than 2, for example less Z less than 1, for example less Z less than 0.5, for example less Z less than 0.1, or Z of zero.

In certain preferred embodiments, the silicon-carbon composite material comprises a Z less than 5 and a carbon scaffold with >70% microporosity, for example Z less than 5 and >80% microporosity, for example Z less than 5 and >90% microporosity, for example Z less than 5 and >95% microporosity, for example Z less than 4 and >70% microporosity, for example Z less than 4 and >80% microporosity, for example Z less than 4 and >90% microporosity, for example Z less than 4 and >95% microporosity, for example Z less than 3 and >70% microporosity, for example Z less than 3 and >80% microporosity, for example Z less than 3 and >90% microporosity, for example Z less than 3 and >95% microporosity, for example Z less than 2 and >70% microporosity, for example Z less than 2 and >80% microporosity, for example Z less than 2 and >90% microporosity, for example Z less than 2 and >95% microporosity, for example Z less than 1 and >70% microporosity, for example Z less than 1 and >80% microporosity, for example Z less than 1 and >90% microporosity, for example Z less than 1 and >95% microporosity, for example Z less than 0.5 and >70% microporosity, for example Z less than 0.5 and >80% microporosity, for example Z less than 0.5 and >90% microporosity, for example Z less than 0.5 and >95% microporosity, for example Z less than 0.1 and >70% microporosity, for example Z less than 0.1 and >80% microporosity, for example Z less than 0.1 and >90% microporosity, for example Z less than 0.1 and >95% microporosity, for example Z of zero and >70% microporosity, for example Z of zero and >80% microporosity, for example Z of zero and >90% microporosity, for example Z of zero and >95% microporosity.

In certain preferred embodiments, the silicon-carbon composite material comprises a Z less than 5 and a carbon scaffold with >70% microporosity, and wherein the silicon-carbon composite also comprises 15%-85% silicon, and surface area less than 100 m2/g, for example Z less than 5 and >70% microporosity, and wherein the silicon-carbon composite also comprises 15%-85% silicon, and surface area less than 50 m2/g, for example Z less than 5 and >70% microporosity, and wherein the silicon-carbon composite also comprises 15%-85% silicon, and surface area less than 30 m2/g, for example Z less than 5 and >70% microporosity, and wherein the silicon-carbon composite also comprises 15%-85% silicon, and surface area less than 10 m2/g, for example Z less than 5 and >70% microporosity, and wherein the silicon-carbon composite also comprises 15%-85% silicon, and surface area less than 5 m2/g, for example Z less than 5 and >80% microporosity, and wherein the silicon-carbon composite also comprises 15%-85% silicon, and surface area less than 50 m2/g, for example Z less than 5 and >80% microporosity, and wherein the silicon-carbon composite also comprises 15%-85% silicon, and surface area less than 30 m2/g, for example Z less than 5 and >80% microporosity, and wherein the silicon-carbon composite also comprises 15%-85% silicon, and surface area less than 10 m2/g, for example Z less than 5 and >80% microporosity, and wherein the silicon-carbon composite also comprises 15%-85% silicon, and surface area less than 5 m2/g, for example Z less than 5 and >90% microporosity, and wherein the silicon-carbon composite also comprises 15%-85% silicon, and surface area less than 50 m2/g, for example Z less than 5 and >90% microporosity, and wherein the silicon-carbon composite also comprises 15%-85% silicon, and surface area less than 30 m2/g, for example Z less than 5 and >90% microporosity, and wherein the silicon-carbon composite also comprises 15%-85% silicon, and surface area less than 10 m2/g, for example Z less than 5 and >90% microporosity, and wherein the silicon-carbon composite also comprises 15%-85% silicon, and surface area less than 5 m2/g, for example Z less than 5 and >95% microporosity, and wherein the silicon-carbon composite also comprises 15%-85% silicon, and surface area less than 50 m2/g, for example Z less than 5 and >95% microporosity, and wherein the silicon-carbon composite also comprises 15%-85% silicon, and surface area less than 30 m2/g, for example Z less than 5 and >95% microporosity, and wherein the silicon-carbon composite also comprises 15%-85% silicon, and surface area less than 10 m2/g, for example Z less than 5 and >95% microporosity, and wherein the silicon-carbon composite also comprises 15%-85% silicon, and surface area less than 5 m2/g.

In certain preferred embodiments, the silicon-carbon composite material comprises a Z less than 5 and a carbon scaffold with >70% microporosity, and wherein the silicon-carbon composite also comprises 30%-60% silicon, and surface area less than 100 m2/g, for example Z less than 5 and >70% microporosity, and wherein the silicon-carbon composite also comprises 30%-60% silicon, and surface area less than 50 m2/g, for example Z less than 5 and >70% microporosity, and wherein the silicon-carbon composite also comprises 30%-60% silicon, and surface area less than 30 m2/g, for example Z less than 5 and >70% microporosity, and wherein the silicon-carbon composite also comprises 30%-60% silicon, and surface area less than 10 m2/g, for example Z less than 5 and >70% microporosity, and wherein the silicon-carbon composite also comprises 30%-60% silicon, and surface area less than 5 m2/g, for example Z less than 5 and >80% microporosity, and wherein the silicon-carbon composite also comprises 30%-60% silicon, and surface area less than 50 m2/g, for example Z less than 5 and >80% microporosity, and wherein the silicon-carbon composite also comprises 30%-60% silicon, and surface area less than 30 m2/g, for example Z less than 5 and >80% microporosity, and wherein the silicon-carbon composite also comprises 30%-60% silicon, and surface area less than 10 m2/g, for example Z less than 5 and >80% microporosity, and wherein the silicon-carbon composite also comprises 30%-60% silicon, and surface area less than 5 m2/g, for example Z less than 5 and >90% microporosity, and wherein the silicon-carbon composite also comprises 30%-60% silicon, and surface area less than 50 m2/g, for example Z less than 5 and >90% microporosity, and wherein the silicon-carbon composite also comprises 30%-60% silicon, and surface area less than 30 m2/g, for example Z less than 5 and >90% microporosity, and wherein the silicon-carbon composite also comprises 30%-60% silicon, and surface area less than 10 m2/g, for example Z less than 5 and >90% microporosity, and wherein the silicon-carbon composite also comprises 30%-60% silicon, and surface area less than 5 m2/g, for example Z less than 5 and >95% microporosity, and wherein the silicon-carbon composite also comprises 30%-60% silicon, and surface area less than 50 m2/g, for example Z less than 5 and >95% microporosity, and wherein the silicon-carbon composite also comprises 30%-60% silicon, and surface area less than 30 m2/g, for example Z less than 5 and >95% microporosity, and wherein the silicon-carbon composite also comprises 30%-60% silicon, and surface area less than 10 m2/g, for example Z less than 5 and >95% microporosity, and wherein the silicon-carbon composite also comprises 30%-60% silicon, and surface area less than 5 m2/g.

Example 3. dV/dQ for various silicon-composite materials. Differential capacity curve (dQ/dV vs Voltage) is often used as a non-destructive tool to understand the phase transition as a function of voltage in lithium battery electrodes (M. N. Obrovac et al. Structural Changes in Silicon Anodes during Lithium Insertion/Extraction, Electrochemical and Solid-State Letters, 7 (5) A93-A96 (2004); Ogata, K. et al. Revealing lithium-silicide phase transformations in nano-structured silicon-based lithium ion batteries via in situ NMR spectroscopy. Nat. Commun. 5:3217). Differential capacity plots presented here is calculated from the data obtained using galvanostatic cycling at 0.1C rate between 5 mV to 0.8V in a half-cell coin cell at 25° C. Typical differential capacity curve for a silicon-based material in a half-cell vs lithium can be found in many literature references (Loveridge, M. J. et al. Towards High Capacity Li-Ion Batteries Based on Silicon-Graphene Composite Anodes and Sub-micron V-doped LiFePO4 Cathodes. Sci. Rep. 6, 37787; doi: 10.1038/srep37787 (2016); M. N. Obrovac et al. $Li_{15}Si_4$Formation in Silicon Thin Film Negative Electrodes, Journal of The Electrochemical Society, 163 (2) A255-A261 (2016); Q. Pan et al. Improved electrochemical performance of micro-sized SiO-based composite anode by prelithiation of stabilized lithium metal powder, Journal of Power Sources 347 (2017) 170-177). First cycle lithiation behavior is dependent on the crystallinity of the silicon and oxygen content among other factors.

After first cycle, previous amorphous silicon materials in the art exhibit two specific phase transition peaks in the dQ/dV vs V plot for lithiation, and correspondingly two specific phase transition peaks in the dQ/dV vs V plot for delithiation. For lithiation, one peak corresponding to lithium-poor Li—Si alloy phase occurs between 0.2-0.4 V and another peak corresponding to a lithium-rich Li—Si alloy phase occurs below 0.15 V. For delithiation, one delithiation peak corresponding to the extraction of lithium occurs below 0.4 V and another peak occurs between 0.4 V and 0.55 V. If the $Li_{15}Si_4$ phase is formed during lithiation, it is delithiated at ~0.45V and appears as a very narrow sharp peak.

FIG. 2 depicts the dQ/dV vs Voltage curve for cycle 2 for the silicon-carbon composite material corresponding to Silicon-Carbon Composite 3 from Example 1. Silicon-Carbon Composite 3 comprises a Z of 0.4. For ease of identification, the plot is divided into regimes I, II, II, IV, V, and VI. Regimes I (0.8 V to 0.4 V), II (0.4 V to 0.15 V), III (0.15 V to 0 V) comprise the lithiation potentials and Regimes IV (0 V to 0.4 V), V (0.4 V to 0.55 V), VI (0.55 V to 0.8 V) comprise the delithiation potential. As described above, previous amorphous silicon-based materials in the art exhibit phase-transition peaks for two regimes (Regime II and Regime III) in the lithiation potential and two regimes (Regime IV and Regime V) in the dethiation potentials.

As can be seen in FIG. 2, the dQ/dV vs Voltage curve reveals surpsising and unexpected result that Silicon-Carbon Composite 3, which comprises a Z of 0.4, comprises two additional peaks in the dQ/dV vs Voltage curve, namely Regime I in the lithiation potential and Regime VI in the delithiation potential. All 6 peaks are are reversible and observed in the subsequent cycles as well, as shown in FIG. 3.

Without being bound by theory, such trimodal behavior for the dQ/dV vs V curve is novel, and likewise reflects a novel form of silicon.

Notably, the novel peaks observed in Regime I and Regime VI are more pronounced in certain scaffold matrixes and completely absent in others samples illustrating the prior art (silicon-carbon composite samples with Z>5, see explanation and table below).

FIG. 4 presents the dQ/dV vs V curve for Silicon-Carbon Composite 3, wherein the novel peaks in Regime I and Regime VI are evident, in comparison to Silicon-Carbon Composite 20, Silicon-Carbon Composite 21, and Silicon-Carbon Composite 19, all three of which comprise Z>5 and whose dQ/dV vs V curves are devoid of the any peaks in Regime I and Regime VI.

Without being bound by theory, these novel peaks observed in Regime I and Regime VI relate to the properties of the silicon impregnated into the porous carbon scaffold, i.e., related to the interactions between and among the properties of the porous carbon scaffold, the silicon impregnated into the porous carbon scaffold via CVI, and lithium. In order to provide a quantitative analysis, we herein define the parameter q, which is calculated as the normalized peak I with respect to peak III as:

$$\varphi=(\text{Max peak height dQ/dV in Regime I})/(\text{Max peak height dQ/dV in Regime III})$$

where dQ/dV is measured in a half-cell coin cell, and regime I is 0.8V-0.4V and Regime III is 0.15V-0V; the half-cell coin cell is produced as known in the art. If the Si—C sample shows peaks associated with graphite in regime III of the differential curve, it is omitted in favor of Li—Si related phase transition peaks for the calculation of D factor. For this example, the half-cell coin cell comprises an anode comprising 60-90% silicon-carbon composite, 5-20% SBR—Na-CMC, and 5-20% Super C45. An example for φ calculation is shown in FIG. 5 for Silicon-Carbon Composite 3. In this instance, the maximum peak height in the regime I is-2.39 and is found at voltage 0.53V. Similarly, maximum peak height in regime III is-9.71 at 0.04V. In this instance, q can be calculated using the above formula, yielding φ=−2.39/−9.71=0.25. The value of φ was determined from the half-cell coin cell data for the various silicon-carbon composites presented in Example 2. These data are summarized in Table 6.

TABLE 6

Properites of various silicon-carbon carbon scaffold materials.

| Silicon-Carbon Composite # | Carbon Scaffold # | Surface Area (m2/g) | Si content (%) | Z | Average CE (7-20) | φ |
|---|---|---|---|---|---|---|
| 1 | 1 | 7 | 45.0 | 0 | 0.9981 | 0.24 |
| 2 | 1 | 7 | 45.4 | 0.4 | 0.9980 | 0.24 |
| 3 | 1 | 6 | 45.8 | 0.4 | 0.9975 | 0.25 |
| 4 | 2 | 33.7 | 45.8 | 0.43 | 0.9993 | 0.20 |
| 5 | 3 | 3.06 | 50.1 | 1.0 | 0.9969 | 0.18 |
| 6 | 2 | 95 | 42.0 | 1.79 | 0.9970 | 0.20 |
| 7 | 3 | 1.96 | 51.3 | 2.0 | 0.9974 | 0.18 |
| 8 | 2 | 4.5 | 46.4 | 2.29 | 0.9987 | 0.19 |
| 9 | 4 | 140 | 43.1 | 2.40 | 0.9941 | 0.13 |
| 10 | 3 | 1.61 | 48.7 | 2.78 | 0.9977 | 0.19 |
| 11 | 3 | 2 | 48.5 | 3.01 | 0.9972 | 0.19 |
| 12 | 5 | 8 | 46.3 | 3.4 | 0.9976 | 0.20 |
| 13 | 6 | 44 | 51.2 | 3.85 | 0.9975 | 0.13 |
| 14 | 2 | 34 | 45.0 | 4.4 | 0.9980 | 0.19 |
| 15 | 7 | 94 | 48.9 | 4.87 | 0.9969 | 0.15 |
| 16 | 8 | 62.7 | 61.6 | 9 | 0.9931 | 0.11 |
| 17 | 9 | 61 | 52.1 | 10.0 | 0.9869 | 0.00 |
| 18 | 10 | 68.5 | 34.6 | 13.8 | 0.9909 | 0.00 |
| 19 | 11 | 20 | 74 | 33.5 | 0.9717 | 0.00 |
| 20 | 11 | 149 | 57.7 | 34.5 | 0.9766 | 0.00 |
| 21 | 11 | 61.7 | 68.9 | 38.69 | 0.9757 | 0.00 |

The data in Table 6 reveal an unexpected relationship between decreasing Z and increasing. All silicon-carbon composites with Z<5 had ≥0.12, and all silicon-carbon composites with Z>5 had φ≤0.11, indeed, in 5 out of 6 cases for silicon-carbon composites with Z>5 had φ=0. This relationship is also evidenced in FIG. 6. Without being bound by theory, silicon materials comprising φ≥0.12 correspond to a novel form of silicon. Alternatively, silicon materials comprising φ>0 correspond to a novel form of silicon. The silicon-carbon composite material comprising silicon comprising φ≥0.12 correspond to a novel silicon-carbon composite material. Alternatively, silicon-carbon composite materials comprising φ>0 corresponds to a novel silicon-carbon composite material.

In certain embodiments, the silicon-carbon composite comprises a φ≥0.12, φ≥0.13, φ≥0.14, φ≥0.15, φ≥0.16, φ≥0.17, φ≥0.18, φ≥0.19, φ≥0.20, φ≥0.21, φ≥0.22, φ≥0.23, φ≥0.24 or φ≥0.25.

In certain embodiments, the silicon-carbon composite material comprises a Z less than 5 and a carbon scaffold with >70% microporosity, and wherein the silicon-carbon composite also comprises 30%-60% silicon, and surface area less than 100 m2/g, and φ≥0.12, for example Z less than 5 and >70% microporosity, and wherein the silicon-carbon composite also comprises 30%-60% silicon, and surface area less than 50 m2/g, and φ≥0.12, for example Z less than 5 and >70% microporosity, and wherein the silicon-carbon composite also comprises 30%-60% silicon, and surface area less than 30 m2/g, and ≥0.12, for example Z less than 5 and >70% microporosity, and wherein the silicon-carbon composite also comprises 30%-60% silicon, and surface area less than 10 m2/g, and φ≥0.12, for example Z less than 5 and >70% microporosity, and wherein the silicon-carbon composite also comprises 30%-60% silicon, and surface area less than 5 m2/g, and φ≥0.12.

In certain embodiments, the silicon-carbon composite material comprises a Z less than 5 and a carbon scaffold with >80% microporosity, and wherein the silicon-carbon composite also comprises 30%-60% silicon, and surface area less than 100 m2/g, and φ≥0.12, for example Z less than 5 and >80% microporosity, and wherein the silicon-carbon composite also comprises 30%-60% silicon, and surface area less than 50 m2/g, and φ≥0.12, for example Z less than 5 and >80% microporosity, and wherein the silicon-carbon composite also comprises 30%-60% silicon, and surface area less than 30 m2/g, and φ≥0.12, for example Z less than 5 and >80% microporosity, and wherein the silicon-carbon composite also comprises 30%-60% silicon, and surface area less than 10 m2/g, and φ≥0.12, for example Z less than 5 and >80% microporosity, and wherein the silicon-carbon composite also comprises 30%-60% silicon, and surface area less than 5 m2/g, and φ≥0.12.

In certain embodiments, the silicon-carbon composite material comprises a Z less than 5 and a carbon scaffold with >90% microporosity, and wherein the silicon-carbon composite also comprises 30%-60% silicon, and surface area less than 100 m2/g, and ≥0.12, for example Z less than 5 and >90% microporosity, and wherein the silicon-carbon composite also comprises 30%-60% silicon, and surface area less than 50 m2/g, and φ≥0.12, for example Z less than 5 and >90% microporosity, and wherein the silicon-carbon composite also comprises 30%-60% silicon, and surface area less than 30 m2/g, and φ≥0.12, for example Z less than 5 and >90% microporosity, and wherein the silicon-carbon composite also comprises 30%-60% silicon, and surface area less than 10 m2/g, and ≥0.12, for example Z less than 5 and >90% microporosity, and wherein the silicon-carbon composite also comprises 30%-60% silicon, and surface area less than 5 m2/g, and φ≥0.12.

In certain embodiments, the silicon-carbon composite material comprises a Z less than 5 and a carbon scaffold with >95% microporosity, and wherein the silicon-carbon composite also comprises 30%-60% silicon, and surface area less than 100 m2/g, and φ≥0.12, for example Z less than 5 and >95% microporosity, and wherein the silicon-carbon composite also comprises 30%-60% silicon, and surface area less than 50 m2/g, and φ≥0.12, for example Z less than 5 and >95% microporosity, and wherein the silicon-carbon composite also comprises 30%-60% silicon, and surface area less than 30 m2/g, and φ≥0.12, for example Z less than 5 and >95% microporosity, and wherein the silicon-carbon composite also comprises 30%-60% silicon, and surface area less than 10 m2/g, and φ≥0.12, for example Z less than 5 and >95% microporosity, and wherein the silicon-carbon composite also comprises 30%-60% silicon, and surface area less than 5 m2/g, and @≥0.12.

EXPRESSED EMBODIMENTS

Embodiment 1. A material exhibiting φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 2. A material exhibiting φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 3. A silicon-carbon composite material exhibiting φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 4. A silicon-carbon composite material exhibiting φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 5. A silicon-carbon composite material comprising a Z<5 and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 6. A silicon-carbon composite material comprising a Z<5 and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 7. A silicon-carbon composite material comprising a Z<5, surface area <100 m2/g, and >0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 8. A silicon-carbon composite material comprising a Z<5, surface area <100 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 9. A silicon-carbon composite material comprising a Z<5, surface area <50 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 10. A silicon-carbon composite material comprising a Z<5, surface area <50 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 11. A silicon-carbon composite material comprising a Z<5, surface area <30 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 12. A silicon-carbon composite material comprising a Z<5, surface area <30 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 13. A silicon-carbon composite material comprising a Z<5, surface area <10 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 14. A silicon-carbon composite material comprising a Z<5, surface area <10 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 15. A silicon-carbon composite material comprising a Z<5, surface area <5 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 16. A silicon-carbon composite material comprising a Z<5, surface area <5 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 17. A silicon-carbon composite comprising 30% to 60% silicon by weight, a Z<5, surface area <50 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 18. A silicon-carbon composite comprising 30% to 60% silicon by weight, a Z<5, surface area <50 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 19. A silicon-carbon composite comprising 30% to 60% silicon by weight, a Z<5, surface area <30 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 20. A silicon-carbon composite comprising 30% to 60% silicon by weight, a Z<5, surface area <30 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 21. A silicon-carbon composite comprising 30% to 60% silicon by weight, a Z<5, surface area <10 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 22. A silicon-carbon composite comprising 30% to 60% silicon by weight, a Z<5, surface area <10 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 23. A silicon-carbon composite comprising 30% to 60% silicon by weight, a Z<5, surface area <5 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 24. A silicon-carbon composite comprising 30% to 60% silicon by weight, a Z<5, surface area <5 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V.

Embodiment 25. A silicon-carbon composite comprising 30% to 60% silicon by weight, a Z<5, surface area <50 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >70% microporosity.

Embodiment 26. A silicon-carbon composite comprising 30% to 60% silicon by weight, a Z<5, surface area <50 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >70% microporosity.

Embodiment 27. A silicon-carbon composite comprising 30% to 60% silicon by weight, a Z<5, surface area <30 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >70% microporosity.

Embodiment 28. A silicon-carbon composite comprising 30% to 60% silicon by weight, a Z<5, surface area <30 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >70% microporosity.

Embodiment 29. A silicon-carbon composite comprising 30% to 60% silicon by weight, a Z<5, surface area <10 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >70% microporosity.

Embodiment 30. A silicon-carbon composite comprising 30% to 60% silicon by wieght, a Z<5, surface area <10 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >70% microporosity.

Embodiment 31. A silicon-carbon composite comprising 30% to 60% silicon by weight, a Z<5, surface area <5 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >70% microporosity.

Embodiment 32. A silicon-carbon composite comprising 30% to 60% silicon by weight, a Z<5, surface area <5 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >70% microporosity.

Embodiment 33. A silicon-carbon composite comprising 30% to 60% silicon by weight, a Z<5, surface area <30 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >80% microporosity.

Embodiment 34. A silicon-carbon composite comprising 30% to 60% silicon by weight, a Z<5, surface area <30 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >80% microporosity.

Embodiment 35. A silicon-carbon composite comprising 30% to 60% silicon by weight, a Z<5, surface area <10 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >80% microporosity.

Embodiment 36. A silicon-carbon composite comprising 30% to 60% silicon by weight, a Z<5, surface area <10 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >80% microporosity.

Embodiment 37. A silicon-carbon composite comprising 30% to 60% silicon by weight, a Z<5, surface area <5 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >80% microporosity.

Embodiment 38. A silicon-carbon composite comprising 30% to 60% silicon by weight, a Z<5, surface area <5 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >80% microporosity.

Embodiment 39. A silicon-carbon composite comprising 30% to 60% silicon by weight, a Z<5, surface area <30 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >90% microporosity.

Embodiment 40. A silicon-carbon composite comprising 30% to 60% silicon by weight, a Z<5, surface area <30 m2/g, and ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >90% microporosity.

Embodiment 41. A silicon-carbon composite comprising 30% to 60% silicon by weight, a Z<5, surface area <10 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >90% microporosity.

Embodiment 42. A silicon-carbon composite comprising 30% to 60% silicon by weight, a Z<5, surface area <10 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >90% microporosity.

Embodiment 43. A silicon-carbon composite comprising 30% to 60% silicon by weight, a Z<5, surface area <5 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >90% microporosity.

Embodiment 44. A silicon-carbon composite comprising 30% to 60% silicon by weight, a Z<5, surface area <5 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >90% microporosity.

Embodiment 45. A silicon-carbon composite comprising 30% to 60% silicon by weight, a Z<5, surface area <30 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >95% microporosity.

Embodiment 46. A silicon-carbon composite comprising 30% to 60% silicon by weight, a Z<5, surface area <30 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >95% microporosity.

Embodiment 47. A silicon-carbon composite comprising 30% to 60% silicon by weight, a Z<5, surface area <10 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >95% microporosity.

Embodiment 48. A silicon-carbon composite comprising 30% to 60% silicon by weight, a Z<5, surface area <10 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >95% microporosity.

Embodiment 49. A silicon-carbon composite comprising 30% to 60% silicon by weight, a Z<5, surface area <5 m2/g, and φ>0, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >95% microporosity.

Embodiment 50. A silicon-carbon composite comprising 30% to 60% silicon by weight, a Z<5, surface area <5 m2/g, and φ≥0.12, φ=(Max peak height dQ/dV in Regime I)/(Max peak height dQ/dV in Regime III), wherein dQ/dV is measured in a half-cell coin cell, and regime I is 0.8V-0.4V and Regime III is 0.15V-0V, and a carbon scaffold comprising a pore volume, wherein the pore volume comprises >95% microporosity.

Embodiment 51. The silicon-carbon composite of any of the embodiments from Embodiment 1 to Embodiment 50 wherein the silicon-carbon composite comprises a Dv50 between 5 nm and 20 microns.

Embodiment 52. The silicon-carbon composite of any of the embodiments from Embodiment 1 to Embodiment 51 wherein the silicon-carbon composite comprises a capacity of greater than 900 mAh/g.

Embodiment 53. The silicon-carbon composite of any of the embodiments from Embodiment 1 to Embodiment 51 wherein the silicon-carbon composite comprises a capacity of greater than 1300 mAh/g.

Embodiment 54. The silicon-carbon composite of any of the embodiments from Embodiment 1 to Embodiment 51 wherein the silicon-carbon composite comprises a capacity of greater than 1600 mAh/g.

Embodiment 55. An energy storage device comprising a silicon-carbon composite described by any of the embodiments from Embodiment 1 to Embodiment 53.

Embodiment 56. A lithium ion battery comprising a silicon-carbon composite described by any of the embodiments from Embodiment 1 to Embodiment 53.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A battery comprising an anode, wherein the anode comprises a silicon-carbon composite particle comprising:

a. a carbon scaffold comprising a pore volume, wherein the pore volume comprises greater than 80% microporosity;

b. a silicon content of 30% to 60% by weight;

c. a surface area less than 30 m2/g; and d. one or both of:

i. a Z of less than 5, wherein Z=1.875×[(M1100−M800)/M1100]×100, wherein M1100 is a mass of the silicon-carbon composite at 1100° C. and M800 is a mass of the silicon-carbon composite at 800° C. when the silicon-carbon composite is heated under air from about 25° C. to about 1100° C., as determined by thermogravimetric analysis; or ii. a φ of greater than or equal to 0.12, wherein φ=(Max peak height dQ/dV in Regime I)/(Max peak height dQ/dV in Regime III), wherein dQ/dV is measured in a half-cell coin cell, and Regime I is 0.8V-0.4V and Regime III is 0.15V-0V, wherein:

the battery is a lithium-based energy storage device; and the composite particle has a volumetric capacity at least 5% greater than a second lithium-based energy storage device comprising a graphite electrode.

2. The battery of claim 1, wherein the pore volume of the composite particle comprises greater than 90% microporosity.

3. The battery of claim 2, wherein the pore volume comprises greater than 95% microporosity.

4. The battery of claim 2, wherein a plurality of the composite particle comprises a surface area less than 10 m2/g.

5. The battery of claim 2, wherein a plurality of the composite particles comprise a surface area less than 5 m2/g.

6. The battery of claim 3, wherein a plurality of the composite particle comprises a surface area less than 10 m2/g.

7. The battery of claim 3, wherein a plurality of the composite particle comprises a surface area less than 5 m2/g.

8. The battery of claim 7, wherein the plurality of the composite particle comprises a silicon content of 40% to 60% by weight.

9. The battery of claim 2, wherein the composite particles comprises a silicon content of 40% to 60% by weight.

10. The battery of claim 1, wherein the Z is less than 4.

11. The battery of claim 1, wherein the Z is less than 3.

12. The battery of claim 1, wherein the φ is greater than or equal to 0.13.

13. The battery of claim 1, wherein the φ is greater than or equal to 0.14.

14. The battery of claim 1, wherein the composite particle comprises a Dv50 ranging from 5 nm to 20 microns.

15. The silicon carbon composite of claim 1, wherein the composite particle comprises a capacity of greater than 900 mAh/g.

16. The battery of claim 1, wherein the composite particle further comprises lithium.

17. The battery of claim 1, further comprising a cathode, separator, and optionally an electrolyte.

18. The battery of claim 1, wherein a plurality of the composite particles comprises a span less than 3, wherein span is defined as (Dv90−Dv10)/(Dv50), wherein Dv10, Dv50, and Dv90 represent the composite particle size at 10%, 50%, and 90% of the volume distribution.

* * * * *